US008970879B2

(12) United States Patent
Nakamura

(10) Patent No.: US 8,970,879 B2
(45) Date of Patent: Mar. 3, 2015

(54) PRINTING SYSTEM, PRINTING METHOD, AND COMPUTER-READABLE MEDIUM FOR DESIGNATING AND EXECUTING PRINTING VIA THE INTERNET

(75) Inventor: Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 562 days.

(21) Appl. No.: 13/287,980

(22) Filed: Nov. 2, 2011

(65) Prior Publication Data
US 2012/0133974 A1    May 31, 2012

(30) Foreign Application Priority Data

Nov. 30, 2010  (JP) ................................ 2010-267500

(51) Int. Cl.
*G06F 3/12* (2006.01)

(52) U.S. Cl.
CPC .............. *G06F 3/1212* (2013.01); *G06F 3/122* (2013.01); *G06F 3/1236* (2013.01); *G06F 3/126* (2013.01); *G06F 3/1287* (2013.01); *G06F 3/1288* (2013.01)
USPC .......................................... 358/1.15; 358/1.1

(58) Field of Classification Search
None
See application file for complete search history.

(56) References Cited

U.S. PATENT DOCUMENTS

| 6,874,034 | B1 * | 3/2005 | Hertling | 709/245 |
|---|---|---|---|---|
| 7,826,083 | B2 * | 11/2010 | Nakamura | 358/1.15 |
| 8,094,332 | B2 * | 1/2012 | Nakamura | 358/1.15 |
| 2005/0128514 | A1 * | 6/2005 | Wanda et al. | 358/1.15 |
| 2007/0268512 | A1 * | 11/2007 | Sakakibara | 358/1.14 |
| 2007/0273924 | A1 * | 11/2007 | Ozawa | 358/1.15 |

FOREIGN PATENT DOCUMENTS

| JP | 2008-140275 A | 6/2008 |
|---|---|---|
| JP | 2009-294920 A | 12/2009 |

* cited by examiner

*Primary Examiner* — Marcus T Riley
(74) *Attorney, Agent, or Firm* — Fitzpatrick, Cella, Harper & Scinto

(57) ABSTRACT

A print server in a printing system including a print server, at least one mediation apparatus, and at least one image forming apparatus, comprises: a unit configured to establish a connection with the at least one mediation apparatus and to maintain the established connection to be able to transmit data from the print server serving as a source; a unit configured to manage a mediation apparatus and an image forming apparatus in association with each other as a group; a unit configured, upon receiving a print instruction, to determine, among the at least one mediation apparatus, a mediation apparatus to which a print request transfer instruction is to be transmitted, and to transmit the print request transfer instruction to the determined mediation apparatus via the maintained connection; and a unit configured to transmit a print job in response to the print job acquisition request.

11 Claims, 25 Drawing Sheets

FIG. 5

| GROUP ID 802 | DEVICE NAME 803 | PERSISTENT CONNECTION STATE 804 | PERSISTENT CONNECTION ID 805 | GLOBAL IP 806 | LOCAL IP 807 | INSTALLATION LOCATION 808 |
|---|---|---|---|---|---|---|
| 12345 | device1 | Y | 100 | 200.1.1.1 | 192.168.0.1 | BLOCK A, FIFTH FLOOR |
| | printer10 | N | | | 192.168.0.2 | BLOCK B, THIRD FLOOR |
| | MFP10 | N | | | 192.168.0.3 | BLOCK C, FIRST FLOOR |
| 6789 | deviceX | Y | 101 | 210.1.1.1 | 172.24.0.1 | ROOM 31 |
| | printer20 | N | | | 172.24.0.2 | ROOM 32 |
| | MFP20 | N | | | 172.24.0.3 | ROOM 33 |

| | DOCUMENT NAME | DATE / TIME | PAGE COUNT | SIZE |
|---|---|---|---|---|
| ☐ | aaa.doc | 2010 / 9 / 1 10:00 | 10p | 100k |
| ☐ | bbb.pdf | 2010 / 9 / 10 12:00 | 5p | 200k |
| ☐ | ccc.doc | 2010 / 9 / 20 9:00 | 20p | 300k |

LIST OF DOCUMENTS 905  901  902  903  904

906 — PRINT

FIG. 6B

SELECT PRINTER

PRINTER NAME     INSTALLATION LOCATION
○ printer10      BLOCK B, THIRD FLOOR
○ MFP10          BLOCK C, FIRST FLOOR

1001

1002 — NEXT    RETURN

FIG. 6C

PRINT SETTINGS

SCREEN        ON ▽
COLOR         COLOR ▽
COPY COUNT    1
STAPLER       ON ▽

1101 — EXECUTE PRINTING    RETURN

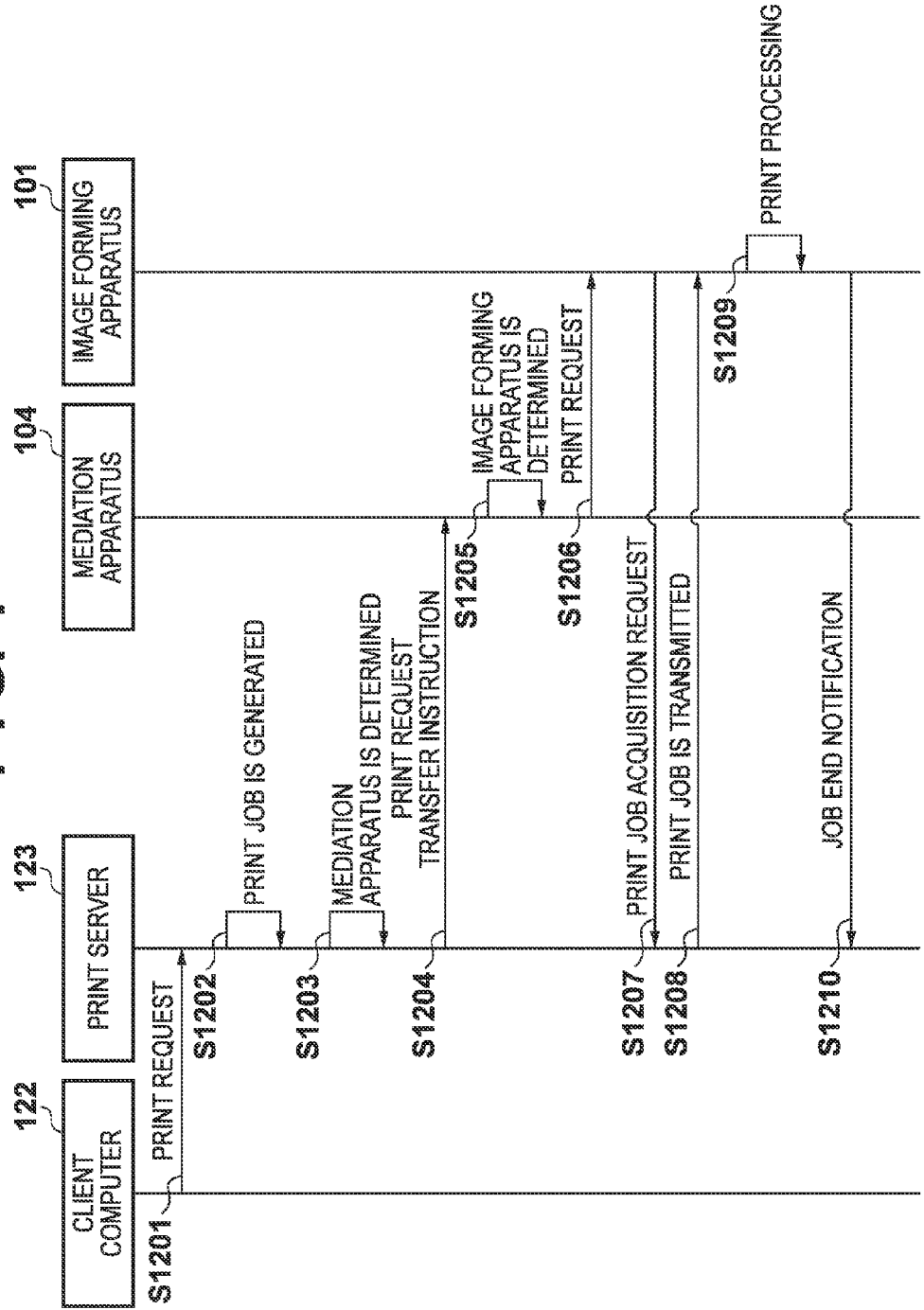

FIG. 8A

```
<ForwardJobRequest>
  <PrinterAddress>192.168.0.2</PrinterAddress>
  <Job>
    <User>user1</User>
    <JobName>aaa.doc</JobName>
    <JobUrl>http://PrintServer.oanon.co.jp/job/job1</JobUrl>
  </Job>
</ForwardJobRequest>
```

FIG. 8B

```
<PrintJobRequest>
  <Job>
    <User>user1</User>
    <JobName>aaa.doc</JobName>
    <JobUrl>http://PrintServer.oanon.co.jp/job/job1</JobUrl>
  </Job>
</PrintJobRequest>
```

FIG. 8C

```
GET /job/job1 HTTP/1.1
HOST: PrintServer.oanon.co.jp
```

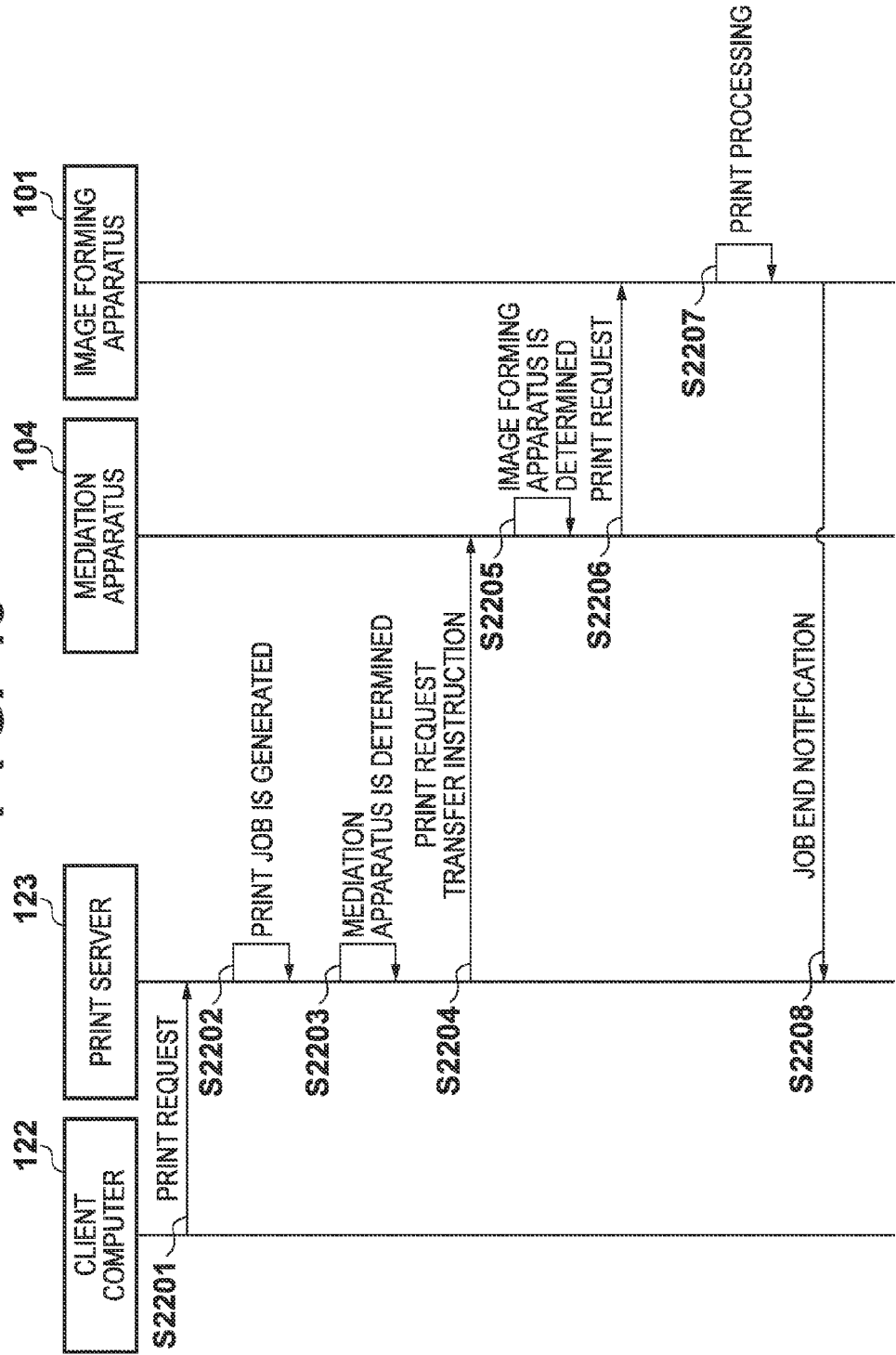

FIG. 14

```
<ForwardJobRequest>
  <PrinterAddress>192.168.0.2</PrinterAddress>
  <Job>
    <User>user1</User>
    <JobName>aaa.doc</JobName>
  </Job>
</ForwardJobRequest>
```

PRINT JOB

FIG. 20A

```
<HelloRequest>
    <DeviceName>printer1</DeviceName>
    <ModelName>Oanon Printer A1</ModelName>
    <DeviceId>abcdef</DeviceId>
    <GroupId>12345</GroupId>
    <Address>192.168.0.2</Address>
    <Location>BLOCK B, THIRD FLOOR</Location>
</HelloRequest>
```

FIG. 20B

```
<HelloResponse>
    <Result>ok</Result>
    <Mediation>true</Mediation>
</HelloResponse>
```

FIG. 20C

```
<HelloResponse>
    <Result>ok</Result>
    <Mediation>false</Mediation>
    <MediationAddress>192.108.0.1</MediationAddress>
</HelloResponse>
```

FIG. 24A

```
<DeviceRegisterRequest>
   <DeviceName>printer1</DeviceName>
   <ModelName>Oanon Printer A1</ModelName>
   <DeviceId>abcdef</DeviceId>
   <GroupId>12345</GroupId>
   <Address>192.168.0.2</Address>
   <Location>BLOCK B, THIRD FLOOR</Location>
   <PrinterInformation>
      <Pdl>BDL,LIPS</Pdl>
      <Finisher>Finisher-A1</Finisher>
      <Deck>PaperDeck-B1</Deck>
   </PrinterInformation>
</DeviceRegisterRequest>
```

FIG. 24B

```
<DeviceRegisterRequest>
   <DeviceName>printer1</DeviceName>
   <ModelName>Oanon Printer A1</ModelName>
   <DeviceId>abcdef</DeviceId>
   <GroupId></GroupId>
   <Address>192.168.0.2</Address>
   <Location>BLOCK B, THIRD FLOOR</Location>
   <PrinterInformation>
      <Pdl>BDL,LIPS</Pdl>
      <Finisher>Finisher-A1</Finisher>
      <Deck>PaperDeck-B1</Deck>
   </PrinterInformation>
</DeviceRegisterRequest>
```

FIG. 24C

```
<DeviceRegisterResponse>
   <Result>ok</Result>
   <GroupId>12345</GroupId>
</DeviceRegisterResponse>
```

PRINTING SYSTEM, PRINTING METHOD, AND COMPUTER-READABLE MEDIUM FOR DESIGNATING AND EXECUTING PRINTING VIA THE INTERNET

BACKGROUND OF THE INVENTION

1. Field of the Invention

The present invention relates to a printing system and printing method for designating and executing printing via the Internet, and a computer-readable medium.

2. Description of the Related Art

Conventionally, a terminal within an office intranet can use various services on the Internet. At this time, it is popular to install a firewall at the boundary between the intranet and the Internet. The firewall is introduced from a security standpoint: it is generally set to permit a connection from an intranet to the Internet but reject a connection from the Internet to the intranet. This can prevent illicit invasion from a terminal on the Internet side into the intranet. Under the circumstances, a communication system using a conventional Web service generally adopts PULL communication in which a client requests a server to acquire information and the server sends back the information as a response to the request.

Recently, a PUSH communication technique of transmitting information from a server serving as a source to a client is being developed. Examples of the PUSH communication technique are Comet and WebSocket.

In Comet, when a client transmits an HTTP (Hypertext Transfer Protocol) request to a server, the server holds it without quickly sending back the response. When information to be transmitted from the server to the client is generated later, the server transmits information to the client as a response to the held request. When a response has been received or a time-out occurs in the connection between the server and the client, the client transmits a request again. This implements an apparent persistent connection. At the timing when an event to which the server should respond occurs, the server can transmit a response without waiting for a request from the client.

WebSocket is a technique for bidirectional communication, which has been defined by Internet standardization groups W3C (World Wide Web Consortium) and IETF (Internet Engineering Task Force). Not HTTP but TCP (Transmission Control Protocol) connection is established and maintained, so mapping in the HTTP protocol becomes unnecessary, unlike Comet. In WebSocket, a connection start request originates from a client. Communication can be carried out a plurality of a number of times from both the client and server at free timings with one connection.

In the PUSH communication technique, a client within an intranet establishes and maintains a connection. Even in an environment where a firewall exists, the server can transmit information using the connection.

A printing system, which has conventionally been used only within an office intranet, is becoming usable via the Internet. The use of the Internet is implemented by PULL communication in which the presence of the firewall makes it hard for an intranet printer to acquire a print job in a print server on the Internet. Japanese Patent Laid-Open No. 2009-294920 discloses a printing system in which a mediation device within an intranet periodically sends an inquiry to a print server on the Internet, and when there is a print job to a printer within the intranet, receives it and transfers it to the printer.

However, in the conventional PULL printing system via the Internet, a print job can be received only at the timing to send an inquiry from a terminal within an intranet to a print server. For this reason, a waiting time may be generated until the printer actually receives a print job after the user issues a print instruction and the print job is accumulated in the print server. To shorten the waiting time, the interval of inquiry to the print server can be shortened. However, this causes another problem such as an increase in network traffic or an increase in processing load on the print server.

In another PULL printing system, simultaneously as the user issues a print instruction, the user's operation terminal transmits a print job acquisition instruction to a printer, and the printer acquires a print job from a print server. This form does not generate a waiting time till reception of the print job, but imposes a limitation in which the user's operation terminal and printer need to be able to communicate with each other. Thus, for example, the user cannot issue a print instruction from a mobile terminal outside the office to a printer in the office.

Recently, to solve the problems of the PULL printing system, there is proposed a printing system using PUSH communication. In the PUSH printing system, a printer within an intranet establishes a connection with a print server and always maintains the connection to allow the print server to transmit a print job to the printer at an arbitrary timing. Japanese Patent Laid-Open No. 2008-140275 discloses a technique in which a printer within an intranet performs communication at an appropriate timing before disconnection and maintains a connection established between the printer and a server.

In the above-mentioned PUSH printing system, each printer within an intranet establishes an persistent connection with a print server. In this case, as the number of printers increases, the processing load to manage persistent connections by the number of printers rises on the print server side. As a result, the operation of the print server becomes unstable or proper processing cannot be done.

SUMMARY OF THE INVENTION

To solve the above problems, the present invention provides a printing system capable of suppressing the load on a print server even when the number of printers increases while making full use of the advantages of the above-described PUSH communication.

According to one aspect of the present invention, there is provided a printing system comprising a print server, at least one mediation apparatus, and at least one image forming apparatus, the print server including: a first connection unit configured to establish a connection with the at least one mediation apparatus and to maintain the established connection to be able to transmit data from the print server serving as a source; a management unit configured to manage a mediation apparatus and an image forming apparatus in association with each other as a group; a transfer instruction transmission unit configured, upon receiving a print instruction, to determine, among the at least one mediation apparatus, a mediation apparatus to which a print request transfer instruction is to be transmitted, and to transmit the print request transfer instruction to the determined mediation apparatus via the maintained connection; and a processing unit configured, upon receiving a print job acquisition request, to transmit a print job in response to the print job acquisition request, the mediation apparatus including: a second connection unit configured to establish a connection with the print server in correspondence with the first connection unit of the print server, and to maintain the established connection to be able to transmit data from the print server serving as a source; a transfer instruction reception unit configured to receive the print request transfer instruction from the print server via the maintained connection; a determination unit configured to analyze the received print request transfer instruction and to determine, among image forming apparatuses associated as the same group, an image forming apparatus which is to execute print processing; and a print request transmission unit configured to transmit a print request to the image forming apparatus determined by the determination unit, and the image forming apparatus including: a print request reception unit configured to receive the print request from the mediation apparatus; a print job acquisition unit configured, in order to acquire a print job corresponding to the print request, to transmit the print job acquisition request to the print server and to receive the print job as a response to the print job acquisition request; and a printing unit configured to execute print processing for the print job received by the print job acquisition unit.

According to another aspect of the present invention, there is provided a printing system comprising a print server, at least one mediation apparatus, and at least one image forming apparatus, the print server including: a first connection unit configured to establish a connection with the at least one mediation apparatus and to maintain the established connection to be able to transmit data from the print server serving as a source; a management unit configured to manage a mediation apparatus and an image forming apparatus in association with each other as a group; and a transfer instruction transmission unit configured, upon receiving a print instruction, to determine, among the at least one mediation apparatus, a mediation apparatus to which a print request transfer instruction is to be transmitted, and to transmit a print request transfer instruction containing a print job to the determined mediation apparatus via the maintained connection, the mediation apparatus including: a second connection unit configured to establish a connection with the print server in correspondence with the first connection unit of the print server, and to maintain the established connection to be able to transmit data from the print server serving as a source; a transfer instruction reception unit configured to receive the print request transfer instruction from the print server via the maintained connection; a determination unit configured to analyze the received print request transfer instruction and to determine, among image forming apparatuses associated as the same group, an image forming apparatus which is to execute print processing; and a print request transmission unit configured to transmit a print request containing a print job to the image forming apparatus determined by the determination unit, and the image forming apparatus including: a print request reception unit configured to receive the print request from the mediation apparatus; and a printing unit configured to execute print processing for the print job contained in the print request received by the print request reception unit.

According to another aspect of the present invention, there is provided a printing method in a printing system including a print server, at least one mediation apparatus, and at least one image forming apparatus, comprising: in the print server, a first connection step of establishing a connection with the at least one mediation apparatus and maintaining the established connection to be able to transmit data from the print server serving as a source; a management step of managing a mediation apparatus and an image forming apparatus in association with each other as a group; a transfer instruction transmission step of, upon receiving a print instruction, determining, among the at least one mediation apparatus, a mediation apparatus to which a print request transfer instruction is to be transmitted, and transmitting the print request transfer instruction to the determined mediation apparatus via the maintained connection; and a processing step of, upon receiving a print job acquisition request, transmitting a print job in response to the print job acquisition request, in the mediation apparatus, a second connection step of establishing a connection with the print server in correspondence with the first connection step in the print server, and maintaining the established connection to be able to transmit data from the print server serving as a source; a transfer instruction reception step of receiving the print request transfer instruction from the print server via the maintained connection; a determination step of analyzing the received print request transfer instruction and determining, among image forming apparatuses associated as the same group, an image forming apparatus which is to execute print processing; and a print request transmission step of transmitting a print request to the image forming apparatus determined in the determination step, and in the image forming apparatus, a print request reception step of receiving the print request from the mediation apparatus; a print job acquisition step of, in order to acquire a print job corresponding to the print request, transmitting the print job acquisition request to the print server and receiving the print job as a response to the print job acquisition request; and a printing step of executing print processing for the print job received in the print job acquisition step.

According to another aspect of the present invention, there is provided a printing method in a printing system including a print server, at least one mediation apparatus, and at least one image forming apparatus, comprising: in the print server, a first connection step of establishing a connection with the at least one mediation apparatus and maintaining the established connection to be able to transmit data from the print server serving as a source; a management step of managing a mediation apparatus and an image forming apparatus in association with each other as a group; and a transfer instruction transmission step of, upon receiving a print instruction, determining, among the at least one mediation apparatus, a mediation apparatus to which a print request transfer instruction is to be transmitted, and transmitting a print request transfer instruction containing a print job to the determined mediation apparatus via the maintained connection, in the mediation apparatus, a second connection step of establishing a connection with the print server in correspondence with the first connection step of the print server, and maintaining the established connection to be able to transmit data from the print server serving as a source; a transfer instruction reception step of receiving the print request transfer instruction from the print server via the maintained connection; a determination step of analyzing the received print request transfer instruction and determining, among image forming apparatuses associated as the same group, an image forming apparatus which is to execute print processing; and a print request transmission step of transmitting a print request containing a print job to the image forming apparatus determined in the determination step, and in the image forming apparatus, a print request reception step of receiving the print request from the mediation apparatus; and a printing step of executing print processing for the print job contained in the print request received in the print request reception step.

According to another aspect of the present invention, there is provided a print server in a printing system including a print server, at least one mediation apparatus, and at least one image forming apparatus, comprising: a connection unit configured to establish a connection with the at least one mediation apparatus and to maintain the established connection to be able to transmit data from the print server serving as a source; a management unit configured to manage a mediation apparatus and an image forming apparatus in association with each other as a group; a transfer instruction transmission unit configured, upon receiving a print instruction, to determine, among the at least one mediation apparatus, a mediation apparatus to which a print request transfer instruction is to be transmitted, and to transmit the print request transfer instruction to the determined mediation apparatus via the maintained connection; and a processing unit configured, upon receiving a print job acquisition request, to transmit a print job in response to the print job acquisition request.

According to one aspect of the present invention, there is provided a mediation apparatus in a printing system including a print server, at least one mediation apparatus, and at least one image forming apparatus, comprising: a connection unit configured to establish a connection with the print server and to maintain the established connection to be able to transmit data from the print server serving as a source; a transfer instruction reception unit configured to receive a print request transfer instruction from the print server via the maintained connection; a determination unit configured to analyze the received print request transfer instruction and to determine, among image forming apparatuses associated as the same group, an image forming apparatus which is to execute print processing; and a print request transmission unit configured to transmit a print request to the image forming apparatus determined by the determination unit.

According to another aspect of the present invention, there is provided an image forming apparatus in a printing system including a print server, at least one mediation apparatus, and at least one image forming apparatus, comprising: a print request reception unit configured to receive a print request from the mediation apparatus; a print job acquisition unit configured, in order to acquire a print job corresponding to the print request, to transmit a print job acquisition request to the print server and to receive the print job as a response to the print job acquisition request; and a printing unit configured to execute print processing for the print job received by the print job acquisition unit.

According to another aspect of the present invention, there is provided a non-transitory computer-readable medium storing a program for causing a computer to function as a connection unit configured to establish a connection with at least one mediation apparatus configured to mediate an instruction to a printing apparatus, and to maintain the established connection to be able to transmit data from the computer serving as a source, a management unit configured to manage a mediation apparatus and an image forming apparatus in association with each other as a group, a transfer instruction transmission unit configured, upon receiving a print instruction, to determine, among the at least one mediation apparatus, a mediation apparatus to which a print request transfer instruction is to be transmitted, and to transmit the print request transfer instruction to the determined mediation apparatus via the maintained connection, and a processing unit configured, upon receiving a print job acquisition request, to transmit a print job in response to the print job acquisition request.

According to another aspect of the present invention, there is provided a non-transitory computer-readable medium storing a program for causing a computer to function as a connection unit configured to establish a connection with the print server and to maintain the established connection to be able to transmit data from the print server serving as a source, a transfer instruction reception unit configured to receive a print request transfer instruction from the print server via the maintained connection, a determination unit configured to analyze the received print request transfer instruction and to determine, among image forming apparatuses associated as the same group, an image forming apparatus which is to execute print processing, and a print request transmission unit configured to transmit a print request to the image forming apparatus determined by the determination unit.

According to another aspect of the present invention, there is provided non-transitory computer-readable medium storing a program for causing a computer to function as a print request reception unit configured to receive a print request, a print job acquisition unit configured, in order to acquire a print job corresponding to the print request, to transmit a print job acquisition request to a print server and receives the print job as a response to the print job acquisition request, and a printing unit configured to execute print processing for the print job received by the print job acquisition unit.

The present invention can provide a printing system capable of suppressing the load on a print server even when the number of printers increases while making full use of the advantages of PUSH communication.

Further features of the present invention will become apparent from the following description of exemplary embodiments (with reference to the attached drawings).

BRIEF DESCRIPTION OF THE DRAWINGS

FIG. 5 is a table exemplifying a device table managed by a device table management unit;

FIGS. 6A, 6B, and 6C are views exemplifying the arrangements of respective display screens according to the first embodiment;

FIG. 7 is a chart showing a print processing sequence according to the first embodiment;

FIGS. 8A, 8B, and 8C are views exemplifying instructions to be transmitted/received in the printing system according to the first embodiment;

FIG. 13 is a chart showing a print processing sequence according to the second embodiment;

FIG. 14 is a view exemplifying a print request transfer instruction;

FIGS. 20A, 20B, and 20C are views exemplifying start-up notifications;

FIGS. 24A, 24B, and 24C are views exemplifying instructions concerning device information registration.

DESCRIPTION OF THE EMBODIMENTS

Embodiments of the present invention will now be described with reference to the accompanying drawings.

First Embodiment

[System Configuration]

Figure 1:
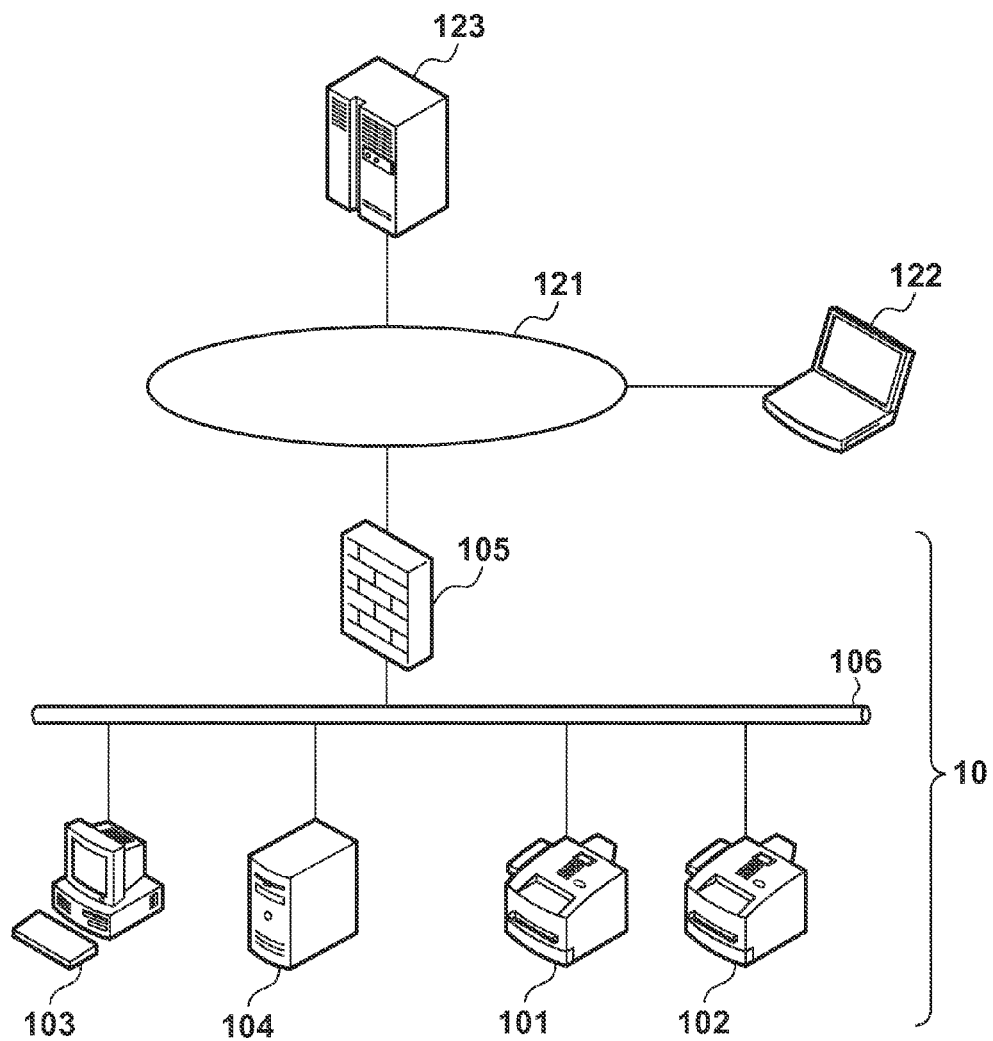
FIG. 1 is a view showing the configuration of a printing system.

FIG. 1 is a view showing the configuration of a printing system according to the present invention. Referring to FIG. 1, an intranet 10, client computer 122, and print server 123 are connected via the Internet 121. Although FIG. 1 shows only one intranet, a plurality of intranets having the same arrangement as that of the intranet 10 can exist and be connected to the Internet 121. In the intranet 10, image forming apparatuses 101 and 102, a client computer 103, and a mediation apparatus 104 are connected via a network 106. A firewall 105 is arranged at the boundary between the intranet 10 and the Internet 121. Image forming apparatuses, client computers, and mediation apparatuses within the intranet 10 may exist in numbers more than those illustrated.

The image forming apparatuses 101 and 102 have a function of receiving and printing a print job accumulated in the print server 123. Note that the image forming apparatus 101 will be described as a representative of the image forming apparatus. The client computers 103 and 122 are terminals which instruct a desired image forming apparatus to print. The client computer 103 exists within the intranet 10, the client computer 122 exists on the Internet 121, and both of them can issue a print instruction. Note that the client computer 122 will be described as a representative of the client computer.

The mediation apparatus 104 establishes an persistent connection with the print server 123, receives information from the print server 123 at an arbitrary timing, and processes it. Note that the mediation apparatus 104 may be configured as a dedicated terminal, as shown in FIG. 1, or a function of the image forming apparatus. In this specification, the "persistent connection" indicates that the print server 123 present on the Internet and the mediation apparatus 104 present within the internet always maintain a connection. By the "persistent connection", the print server 123 on the Internet serves as a source and can transmit data. In the embodiment, the "persistent connection" is implemented using a technique such as Comet or WebSocket described above. However, the "persistent connection" is not limited to these two techniques and may be implemented by another method.

The print server 123 controls the overall printing system, and performs various processes such as processing of a print request from the client computer 122, print job management, management of the image forming apparatus, and management of an persistent connection with the mediation apparatus 104. In the embodiment, the print server 123 functions even as a document management server which manages documents for each user.

[Hardware Configuration]

Figure 2:
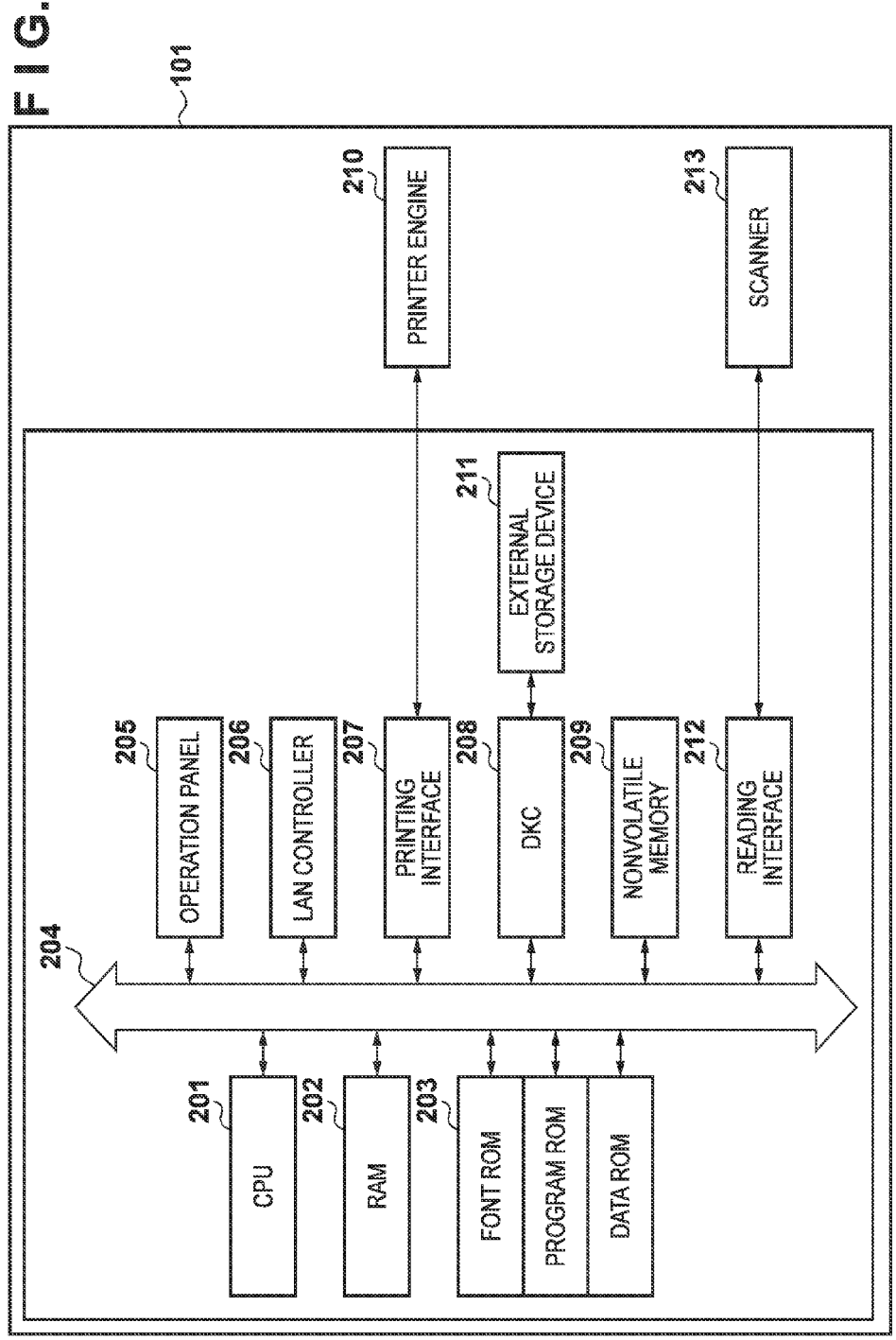
FIG. 2 is a block diagram showing the hardware configuration of an image forming apparatus.

FIG. 2 is a block diagram showing the hardware configuration of the image forming apparatus 101. Note that a copying machine will be exemplified as the image forming apparatus 101. In the image forming apparatus 101 of FIG. 2, a CPU 201 comprehensively controls accesses to various devices connected to a system bus 204, based on a control program stored in the program ROM of a ROM 203 or an external storage device 211. The CPU 201 outputs an image signal as output information to a printing unit (print engine) 210 connected via a printing interface 207, and controls an image signal input from a reading unit (scanner) 213 connected via a reading interface 212.

The program ROM of the ROM 203 stores a control program and the like executable by the CPU 201. The font ROM of the ROM 203 stores font data (including outline font data) and the like used to generate the above-described output information. The data ROM of the ROM 203 stores information and the like used in the client computer.

The CPU 201 can perform communication processing with a client computer and image forming apparatus on the network via a LAN controller 206. A RAM 202 mainly functions as a main memory, work area, and the like for the CPU 201, and the memory capacity can be expanded by an optional RAM connected to an expansion port (not shown). Note that the RAM 202 is used as an output information rasterization area, environmental data storage area, and the like.

A disk controller (DKC) 208 controls an access to the external storage device 211 such as a hard disk (HDD) or IC card. The hard disk stores an application program, font data, form data, and the like, and is used as a job storage area for temporarily spooling a print job and controlling the spooled job from the outside. The hard disk is also used as a BOX data storage area for holding image data scanned by the scanner 213 or image data of a print job as BOX data, referring to it from the network, and printing. In the embodiment, the external storage device 211 is an HDD and holds various logs such as a job log and image log. The external storage device 211 will be referred to as the HDD 211.

An operation panel 205 allows the user to input various kinds of information from software keys. It is also possible to arrange at least one external storage device 211, and connect a plurality of external memories which store programs for interpreting printer control languages of different language systems, including an optional font card in addition to an internal font. A nonvolatile memory 209 stores various kinds of setting information set from the operation panel 205.

It is also possible to mount various expansion apparatuses (not shown) as options to the image forming apparatus 101, including a finisher (not shown) for performing stapling and sorting, and a double-sided apparatus for implementing a double-sided printing function. The CPU 201 controls the operations of these apparatuses.

Figure 3:
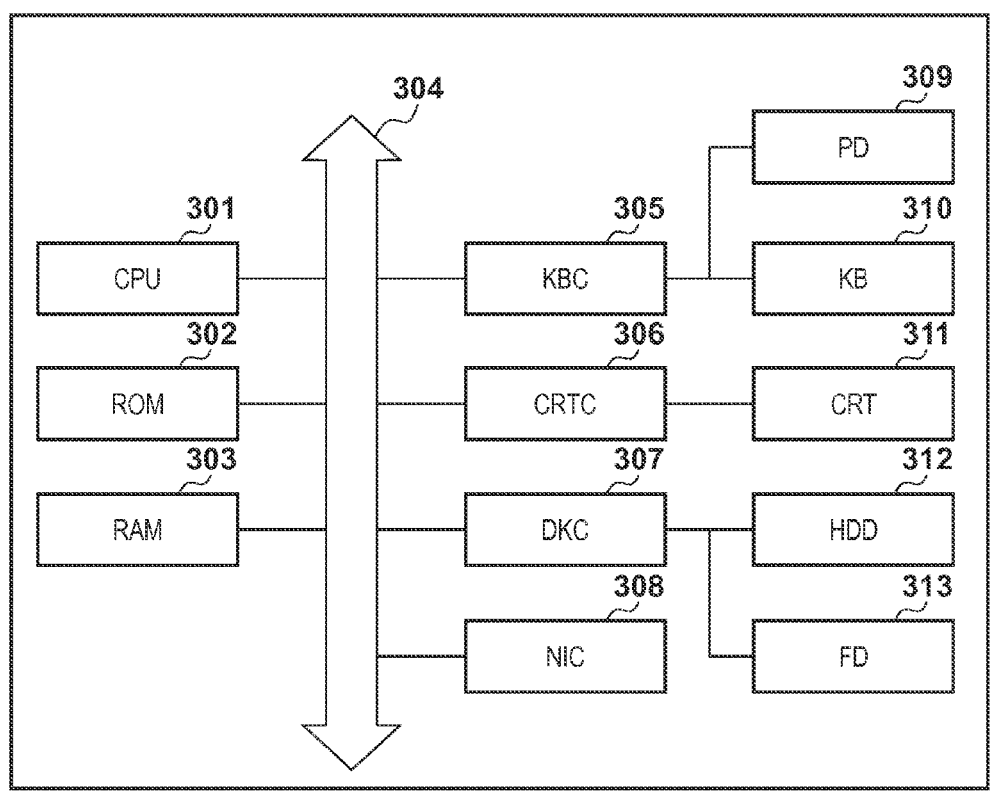
FIG. 3 is a block diagram showing the hardware configuration of each apparatus.

FIG. 3 is a block diagram showing the hardware configuration of the client computer 122, mediation apparatus 104, and print server 123 in the printing system according to the embodiment. Referring to FIG. 3, a CPU 301 controls various devices connected to a system bus 304. A ROM 302 stores a BIOS and boot program. A RAM 303 is used as a main storage device for the CPU 301. A keyboard controller (KBC) 305 executes processes concerning inputs such as information from a pointing device 309 (for example, Mouse®) and a keyboard 310.

A display control unit (CRTC) 306 incorporates a video memory, renders an image in the video memory in accordance with an instruction from the CPU 301, and outputs image data rendered in the video memory as a video signal to a display device (CRT) 311. Note that FIG. 3 exemplifies a CRT as the display device 311, but the type of display device is arbitrary such as a liquid crystal display device. A disk controller (DKC) 307 accesses a hard disk (HDD) 312 and Floppy® disk 313.

A network interface card (NIC) 308 is connected to the network, and communicates information with an external device via the network. Note that the HDD 312 stores an OS, and various application programs and the like which run on the OS. In this arrangement, when the apparatus is turned on, the CPU 301 loads the OS from the HDD 312 into the RAM 303 and executes it in accordance with a boot program stored in the ROM 302.

[Software Configuration]

Figure 4A:
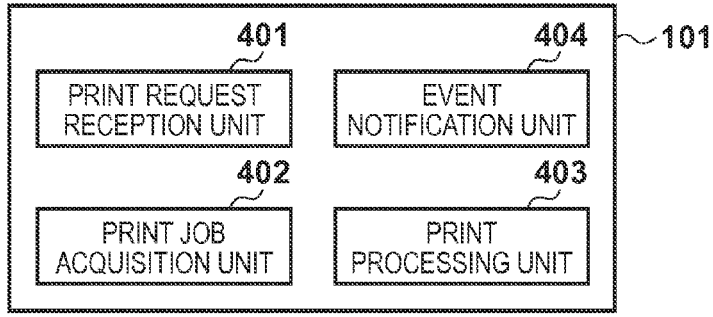
FIGS. 4A, 4B, 4C, and 4D are block diagrams showing the software configurations of respective apparatuses according to the first embodiment.

FIGS. 4A to 4D show the software configurations of the respective apparatuses which build the printing system in the embodiment. FIG. 4A is a block diagram showing the software configuration of the image forming apparatus 101. A print request reception unit 401 receives a print request from the mediation apparatus 104 and transfers, to a print job acquisition unit 402, a URL contained in the print request to acquire a print job. The URL indicates the address of the print server 123 in which print jobs are accumulated. The print job acquisition unit 402 transmits a print job acquisition request in accordance with the received URL, and receives a print job as the response. The print job acquisition unit 402 transfers the received print job to a print processing unit 403. The print processing unit 403 analyzes the print job, rasterizes it into bitmap data, and prints on paper. An event notification unit 404 notifies the print server 123 of the state of the print job such as the end of the job.

Figure 4B:
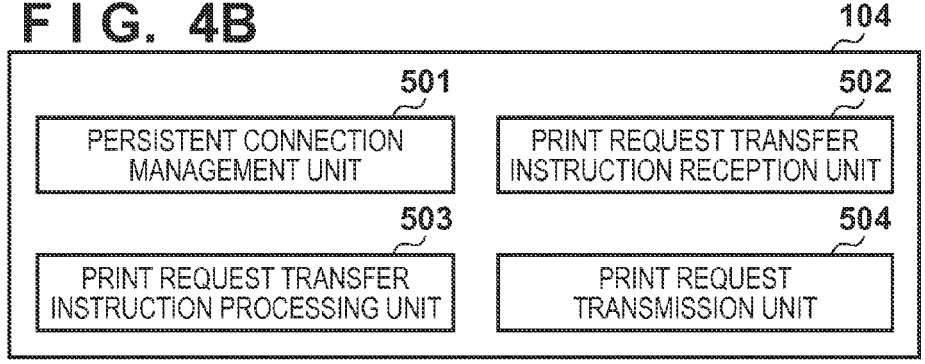

FIG. 4B is a block diagram showing the software configuration of the mediation apparatus 104. A persistent connection management unit 501 establishes a connection with the print server 123, and maintains and manages the established connection as a persistent connection not to disconnect it. In this case, a technique such as Comet or WebSocket described above is employed. A print request transfer instruction reception unit 502 receives a print request transfer instruction from the print server 123 via the established persistent connection at an arbitrary timing, and transfers it to a print request transfer instruction processing unit 503. The print request transfer instruction processing unit 503 analyzes the print request transfer instruction, determines an image forming apparatus to execute printing, and generates a print request. Then, the print request transfer instruction processing unit 503 transfers the generated print request to a print request transmission unit 504. The print request transmission unit 504 transmits the print request to the determined image forming apparatus.

Figure 4C:
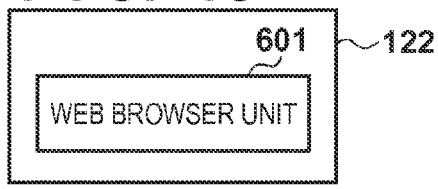

FIG. 4C is a block diagram showing the software configuration of the client computer 122. The client computer 122 suffices to include only a Web browser unit 601. By using the Web browser unit 601, the user connects to the print server 123, displays a document, and inputs a print instruction.

Figure 4D:
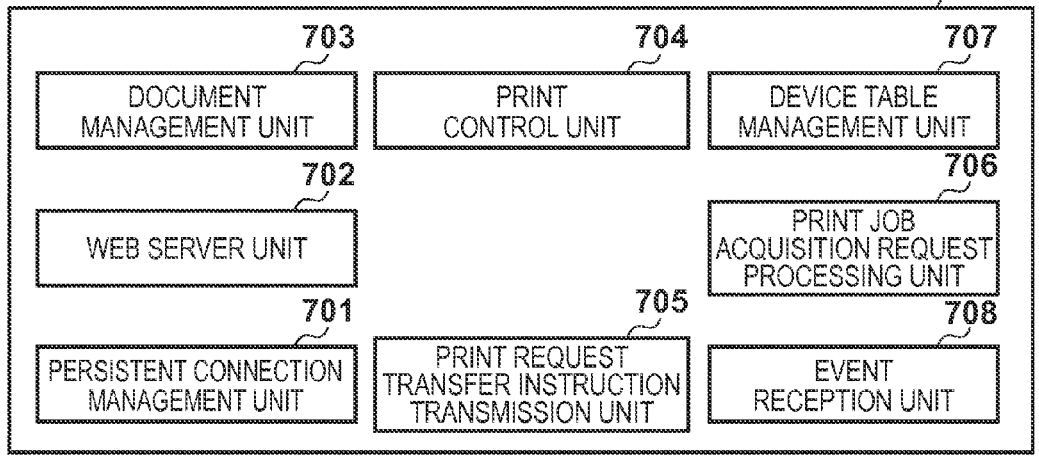

FIG. 4D is a block diagram showing the software configuration of the print server 123. A persistent connection management unit 701 receives a connection request from the mediation apparatus 104, establishes a connection, and maintains and manages the established connection as a persistent connection not to disconnect it. The persistent connection management unit 701 of the print server 123 implements a persistent connection using a technique such as Comet or WebSocket described above in correspondence with the persistent connection management unit 501 of the mediation apparatus 104. The persistent connection management unit 701 reflects the state of the managed connection in a device table to be described later with reference to FIG. 5. A Web server unit 702 provides a UI (User Interface) to the client computer 122, sends back document information which is managed for each user by a document management unit 703, and receives a print instruction from the user. When the Web server unit 702 receives a print instruction, a print control unit 704 generates and temporarily accumulates a print job suited to an image forming apparatus designated by the print instruction.

By looking up the device table, a print request transfer instruction transmission unit 705 determines, among a plurality of managed mediation apparatuses, the mediation apparatus 104 to which a print request transfer instruction is to be transmitted. Then, the print request transfer instruction transmission unit 705 transmits the print request transfer instruction to the determined mediation apparatus 104 via the persistent connection. A print job acquisition request processing unit 706 receives a print job acquisition request from the image forming apparatus 101, and transmits a designated print job to the image forming apparatus 101. A device table management unit 707 manages the device table. An event reception unit 708 receives a print job state notification from the image forming apparatus 101.

Note that the persistent connection management unit 701 of the print server 123 will also be referred to as the first connection unit, and the persistent connection management unit of the mediation apparatus 104 will also be referred to as the second connection unit.

[Device Table]

FIG. 5 exemplifies the device table managed by the device table management unit 707. A device table 801 has a group ID 802, device name 803, persistent connection state 804, persistent connection ID 805, global IP 806, local IP 807, and installation location 808.

As shown in FIG. 5, the device table management unit 707 groups and manages one or more mediation apparatuses and one or more image forming apparatuses. That is, each of mediation apparatuses and image forming apparatuses belongs to a group identified by a group ID. The group ID 802 is identification information (identifier) for uniquely identifying a group. The device name 803 is a name for identifying a mediation apparatus or image forming apparatus. The persistent connection state 804 is information indicating whether each apparatus has established a persistent connection with the print server 123, and the persistent connection management unit 701 updates the state. This information becomes "Y" only for a mediation apparatus and "N" for an image forming apparatus. As will be described in the third embodiment, when the image forming apparatus has the function of the mediation apparatus, the connection may become "Y" even for the image forming apparatus.

The persistent connection ID 805 is an identifier for identifying a persistent connection in the print server 123. By designating the persistent connection ID, each program of the print server 123 can transmit/receive information to/from the actual mediation apparatus 104. The global IP 806 is a global IP address corresponding to a mediation apparatus which has established a persistent connection. For an image forming apparatus other than a mediation apparatus, no global IP address exists. The local IP 807 is a local IP address within the intranet of each apparatus. That is, the local IP 807 indicates a local IP address within an intranet to which each apparatus belongs. The same local IP address may be set for different apparatuses belonging to different networks. Even if apparatuses belong to the same intranet, they may belong to different groups. The installation location 808 is the installation location of each apparatus, and is used as reference information when the user selects an image forming apparatus to print. The embodiment assumes that the administrator has created the device table 801 in advance.

[Print Processing Sequence]

A sequence to execute printing in the printing system will be explained. FIGS. 6A to 6C exemplify screens used in the printing system. Note that these screens are merely examples, and the present invention is not limited to the layout and configuration.

FIG. 6A shows a screen which displays a list of documents in the print server 123 on the Web browser unit 601. A list of documents accessible by a user who has logged in to the print server 123 is displayed together with various kinds of information such as a document name 901, date 902, page count 903, and size 904. The user checks a check box 905 of a document he wants from this screen, and presses a print button 906. Then, the screen shifts to a printer selection screen as shown in FIG. 6B.

FIG. 6B exemplifies the printer selection screen. This screen displays a list of printers usable by the user. The user checks a check box 1001 of a printer he wants, and presses a button 1002. Then, the screen shifts to a print setting screen as shown in FIG. 6C.

FIG. 6C exemplifies the print setting screen. The user makes print settings he wants on this screen, and presses a print execution button 1101. Then, step S1201 to be described with reference to FIG. 7 is executed to print.

FIG. 7 shows a print processing sequence according to the first embodiment. A program concerning this processing sequence by the image forming apparatus 101 is stored in the HDD 211 of the image forming apparatus 101, read out to the RAM 202, and executed by the CPU 201. Each of programs by the print server 123, client computer 122, and mediation apparatus 104 is stored in the HDD 312 of a corresponding apparatus, read out to the RAM 303, and executed by the CPU 301. FIGS. 8A to 8C show the structures of data to be transmitted/received between the apparatuses. Note that the data structures shown in FIGS. 8A to 8C are merely examples, and the present invention is not limited to them.

In step S1201, the client computer 122 accepts a user input, and transmits a document print request to the print server 123.

In step S1202, the print server 123 generates a print job suited to a designated image forming apparatus, and temporarily accumulates it. In step S1203, the print server 123 looks up the device table 801 and determines a mediation apparatus to which a print request is to be transmitted. In step S1204, the print server 123 transmits a print request transfer instruction shown in FIG. 8A to the mediation apparatus 104.

In step S1205, the mediation apparatus 104 analyzes the received print request transfer instruction and determines an image forming apparatus to print. In step S1206, the mediation apparatus 104 transmits a print request shown in FIG. 8B to the image forming apparatus 101.

In step S1207, the image forming apparatus 101 extracts, from the print request received from the mediation apparatus 104, a URL for acquiring a print job, and transmits a print job acquisition request shown in FIG. 8C to the print server 123.

In step S1208, the print server 123 transmits the print job to the image forming apparatus 101. In step S1209, the image forming apparatus 101 performs print processing for the received print job. After the end of print processing, the image forming apparatus 101 transmits a job end notification to the print server 123 in step S1210. After that, the sequence ends. Although not shown in FIG. 7, after receiving a job end notification from the image forming apparatus 101, the print server 123 may transmit an end notification to the client computer 122 which has issued a print request.

FIG. 8A exemplifies the structure of a print request transfer instruction to be transmitted from the print server 123 to the mediation apparatus 104. Following a <ForwardJobRequest> tag indicating a print request transfer instruction, a <PrinterAddress> tag designates the local IP address of an image forming apparatus to print. The mediation apparatus 104 generates a print request to the image forming apparatus from the received print request transfer instruction, and transmits the generated print request to the designated local IP address. The print request transfer instruction contains print job information.

FIG. 8B exemplifies a print request to be transmitted from the mediation apparatus 104 to the image forming apparatus 101. Following a <PrintJobRequest> tag indicating a print request, a <Job> tag indicates print job information. The print job information is generated based on information contained in the print request transfer instruction shown in FIG. 8A. A <User> tag indicates the name of a user who executed printing, and a <JobName> tag indicates a document name. A <JobUrl> tag indicates a URL where the print job is temporarily accumulated, and the image forming apparatus 101 transmits a print job acquisition request to this URL.

FIG. 8C exemplifies a print job acquisition request to be transmitted from the image forming apparatus 101 to the print server 123. The print job acquisition request designates, at the path portion, a URL designated by <JobUrl> in FIG. 8B as the GET operation of the HTTP protocol.

[Processing Sequence (Print Server)]

Figure 9:
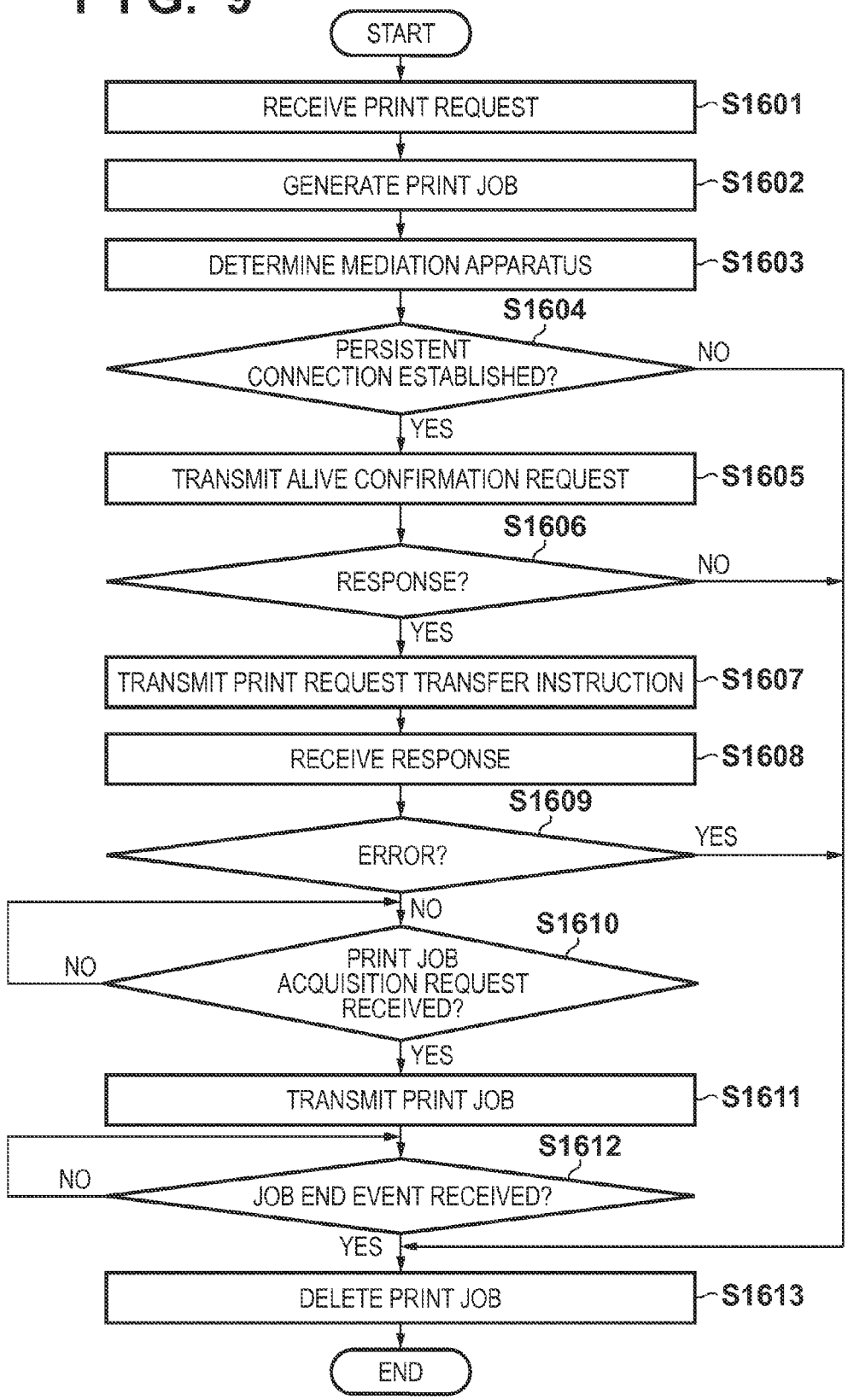
FIG. 9 is a flowchart showing processing concerning a print instruction.

FIG. 9 is a flowchart showing details of processing when the print server 123 receives a print request in FIG. 7. In the embodiment, a program concerning this processing sequence by the print server 123 is stored in the HDD 312 of the print server 123, read out to the RAM 303, and executed by the CPU 301.

In step S1601, the Web server unit 702 receives a print request from the client computer 122. In step S1602, the print control unit 704 generates and temporarily accumulates a print job suited to an image forming apparatus designated by the print request. In step S1603, the print request transfer instruction transmission unit 705 looks up the device table 801 and determines the mediation apparatus 104 to which a print request transfer instruction is to be transmitted. In step S1604, the print request transfer instruction transmission unit 705 determines whether a persistent connection with the mediation apparatus 104 has been established. If the persistent connection has been established (YES in step S1604), the process advances to step S1605, and the print request transfer instruction transmission unit 705 transmits an alive confirmation request to the mediation apparatus 104. The alive confirmation request may use a protocol such as ping.

In step S1606, the print request transfer instruction transmission unit 705 determines whether a response has been received from the mediation apparatus 104. If a response has been received (YES in step S1606), the process advances to step S1607, and the print request transfer instruction transmission unit 705 transmits a print request transfer instruction to the mediation apparatus 104.

The print request transfer instruction transmission unit 705 receives a response to the print request transfer instruction from the mediation apparatus 104 in step S1608, and determines in step S1609 whether the received response is an error response. If the received response is not an error response (NO in step S1609), the print job acquisition request processing unit 706 waits until a print job acquisition request is received from the image forming apparatus 101 in step S1610.

In step S1611, upon receiving a print job acquisition request from the image forming apparatus 101, the print job acquisition request processing unit 706 transmits a print job as a response to the image forming apparatus 101. In step S1612, the event reception unit 708 waits until a job end notification is received from the image forming apparatus 101. Upon receiving a job end notification, in step S1613 the print control unit 704 deletes the accumulated print job, and notifies the client computer 122 that the print processing has ended. The process then ends.

If no persistent connection has been established (NO in step S1604), no response has been received from the mediation apparatus 104 (NO in step S1606), or a response to the print request transfer instruction is an error response (YES in step S1609), the process advances to step S1613. The print control unit 704 deletes the accumulated print job, and notifies the client computer 122 that the processing has failed. The process then ends.

[Processing Sequence (Mediation Apparatus)]

Figure 10:
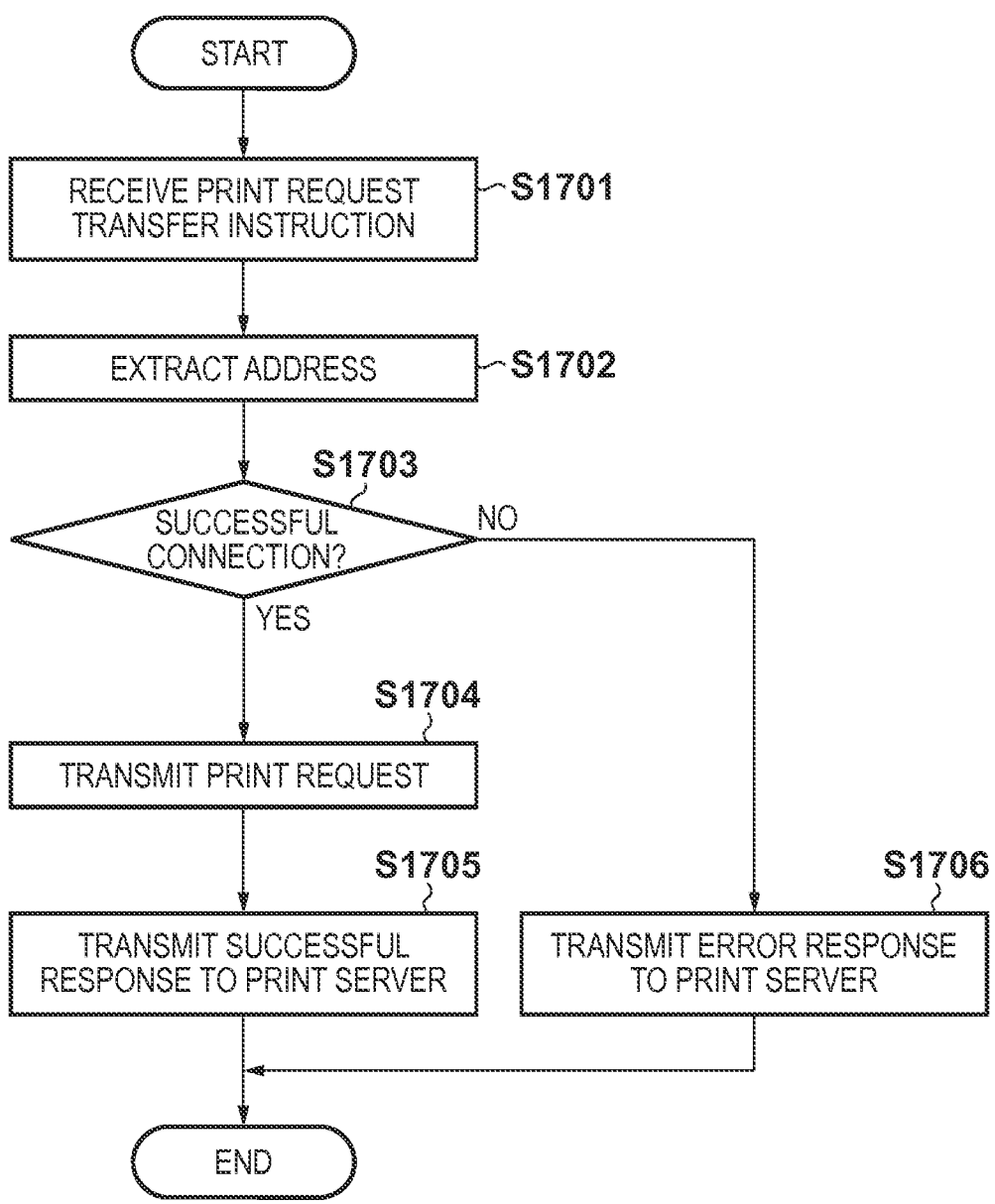
FIG. 10 is a flowchart showing processing concerning a print request transfer instruction.

FIG. 10 is a flowchart showing processing when the mediation apparatus 104 receives a print request transfer instruction from the print server 123. A program concerning this processing sequence by the mediation apparatus 104 is stored in the HDD 312 of the mediation apparatus 104, read out to the RAM 303, and executed by the CPU 301.

In step S1701, the print request transfer instruction reception unit 502 receives a print request transfer instruction from the print server 123. In step S1702, the print request transfer instruction processing unit 503 analyzes the received print request transfer instruction and extracts the address of an image forming apparatus to print. In step S1703, the print request transmission unit 504 tries to connect to the extracted address, and determines whether the connection is successful.

If the connection is successful (YES in step S1703), the process advances to step S1704, and the print request transmission unit 504 transmits a print request to the image forming apparatus 101. In step S1705, the print request transfer instruction reception unit 502 transmits, to the print server 123, a successful response to the print request transfer instruction. Thereafter, the process ends. If the connection fails in step S1703 (NO in step S1703), the process advances to step S1706, and the print request transfer instruction reception unit 502 transmits, to the print server 123, an error response to the print request transfer instruction. The process then ends.

[Processing Sequence (Image Forming Apparatus)]

Figure 11:
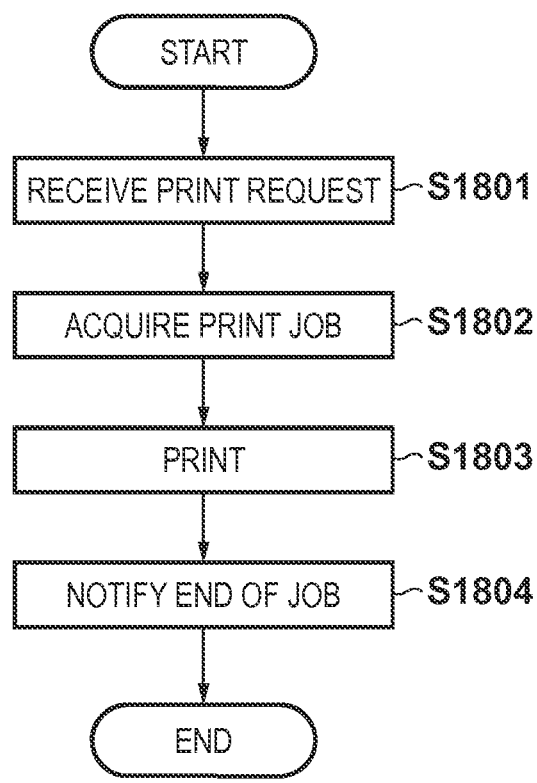
FIG. 11 is a flowchart showing processing concerning a print request.

FIG. 11 is a flowchart showing processing when the image forming apparatus 101 receives a print request from the mediation apparatus 104. In the embodiment, a program concerning this processing sequence by the image forming apparatus 101 is stored in the HDD 211 of the image forming apparatus 101, read out to the RAM 202, and executed by the CPU 201.

In step S1801, the print request reception unit 401 receives a print request from the mediation apparatus 104. In step S1802, the print job acquisition unit 402 transmits a print job acquisition request to the print server 123, and receives a print job as the response. In step S1803, the print processing unit 403 performs print processing for the received print job. In step S1804, the event notification unit 404 transmits a job end notification to the print server 123, and the process ends.

Accordingly, the first embodiment can provide a printing system capable of suppressing the load on the print server even when the number of printers increases, while making full use of the advantages of PUSH communication.

Second Embodiment

The second embodiment will be described. In the first embodiment, a print request to be transmitted from the print server 123 to the mediation apparatus 104 contains the URL of a print job, and the image forming apparatus 101 acquires the print job from the print server 123. In the second embodiment, a print request transfer instruction to be transmitted from a print server 123 to a mediation apparatus 104 contains a print job, and the mediation apparatus 104 transmits the print job to an image forming apparatus 101.

In the arrangement, the mediation apparatus 104 needs to transmit/receive not only a print request transfer instruction but also a print job itself for each image forming apparatus. However, the image forming apparatus 101 can use a printing protocol such as an LPD (Line Printer Daemon) protocol, so no conventional program need be changed. In the second embodiment, a description of the same parts as those in the first embodiment will not be repeated, and only a difference will be explained.

[Software Configuration]

Figure 12A:
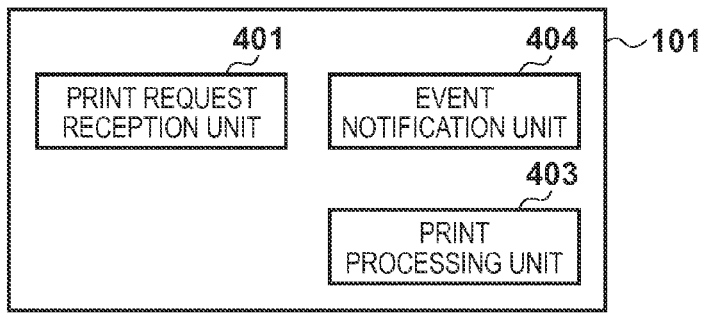
FIGS. 12A, 12B, and 12C are block diagrams showing the software configurations of respective apparatuses according to the second embodiment.
Figure 12B:
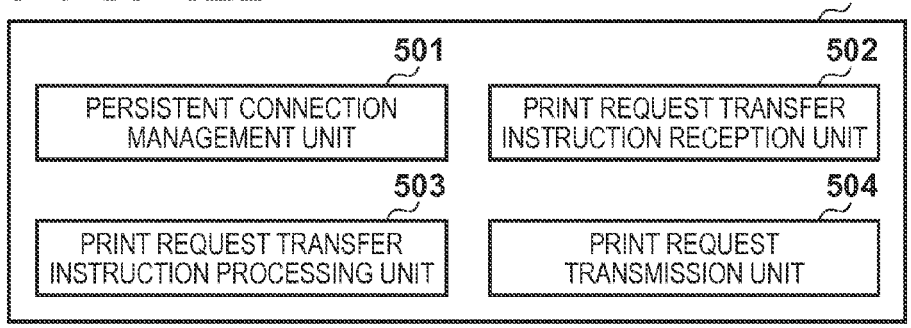
Figure 12C:
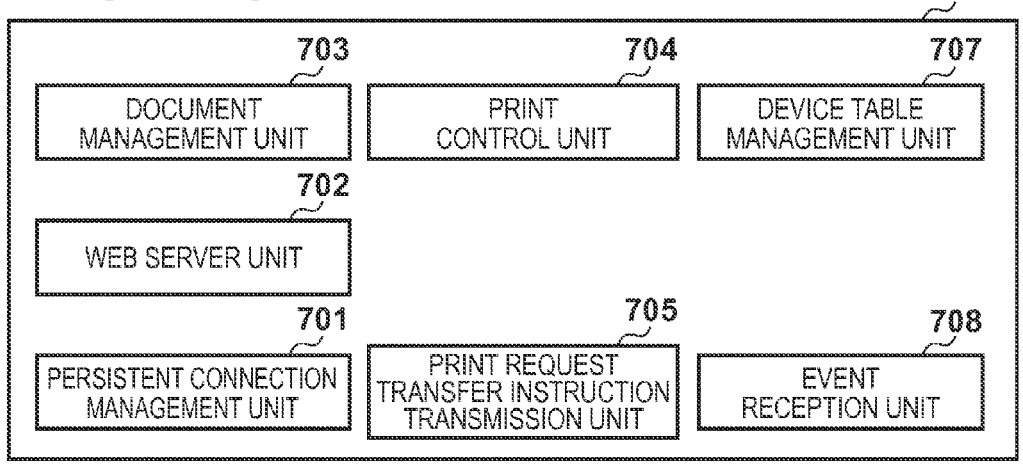

FIGS. 12A to 12C show the software configurations of respective apparatuses contained in a printing system according to the second embodiment.

FIG. 12A is a block diagram showing the software configuration of the image forming apparatus 101. Since the mediation apparatus 104 transmits a print job, the print job acquisition unit 402 is omitted from the configuration in the first embodiment shown FIG. 4A.

FIG. 12B is a block diagram showing the software configuration of the mediation apparatus 104. Although this configuration is the same as that in the first embodiment shown in FIG. 4B, a print request transfer instruction reception unit 502 receives a print request transfer instruction containing a print job from the print server 123 in the second embodiment. A print request transfer instruction processing unit 503 temporarily accumulates the received print job in an HDD 312. A print request transmission unit 504 extracts the print job accumulated in the HDD 312, and transmits it to the image forming apparatus.

FIG. 12C is a block diagram showing the software configuration of the print server 123. Since a generated print job is transmitted to the mediation apparatus 104 together with a print request transfer instruction, the print job acquisition request processing unit 706 is omitted from the configuration in the first embodiment shown in FIG. 4D.

[Print Processing Sequence]

FIG. 13 shows a print processing sequence according to the second embodiment. In the embodiment, a program concerning this processing sequence by the image forming apparatus 101 is stored in an HDD 211 of the image forming apparatus 101, read out to a RAM 202, and executed by a CPU 201. Each of programs by the print server 123, a client computer 122, and the mediation apparatus 104 is stored in the HDD 312 of a corresponding apparatus, read out to a RAM 303, and executed by a CPU 301. FIG. 14 shows the structures of print request transfer instruction data to be transmitted from the print server 123 to the mediation apparatus 104. Note that the data structure shown in FIG. 14 is merely an example, and the present invention is not limited to this.

As described in the first embodiment with reference to FIGS. 6A to 6C, the user inputs a print instruction. In step S2201, the client computer 122 accepts a user input, and transmits a document print request to the print server 123.

In step S2202, the print server 123 generates a print job suited to a designated image forming apparatus, and temporarily accumulates it. In step S2203, the print server 123 looks up a device table 801 and determines a mediation apparatus to which a print request is to be transmitted. In step S2204, the print server 123 transmits a print request transfer instruction shown in FIG. 14 to the mediation apparatus 104. At this time, the print request transfer instruction contains print job information.

In step S2205, the mediation apparatus 104 analyzes the received print request transfer instruction and determines an image forming apparatus to print. Also, the mediation apparatus 104 extracts the print job from the print request transfer instruction. In step S2206, the mediation apparatus 104 transmits a print request containing the extracted print job to the image forming apparatus 101 using a printing protocol such as LPD.

In step S2207, the image forming apparatus 101 performs print processing for the received print job. After the end of print processing, the image forming apparatus 101 transmits a job end notification to the print server 123 in step S2208. Thereafter, the sequence ends. Although not shown in FIG. 13, after receiving a job end notification from the image forming apparatus 101, the print server 123 may transmit an end notification to the client computer 122 which has issued a print request.

FIG. 14 exemplifies a print request transfer instruction to be transmitted from the print server 123 to the mediation apparatus 104. Following a <ForwardJobRequest> tag indicating a print request transfer instruction, a <PrinterAddress> tag designates the local IP address of an image forming apparatus to print. Following XML data of <ForwardJobRequest>, a print job is transmitted in the binary format.

[Processing Sequence (Print Server)]

Figure 15:
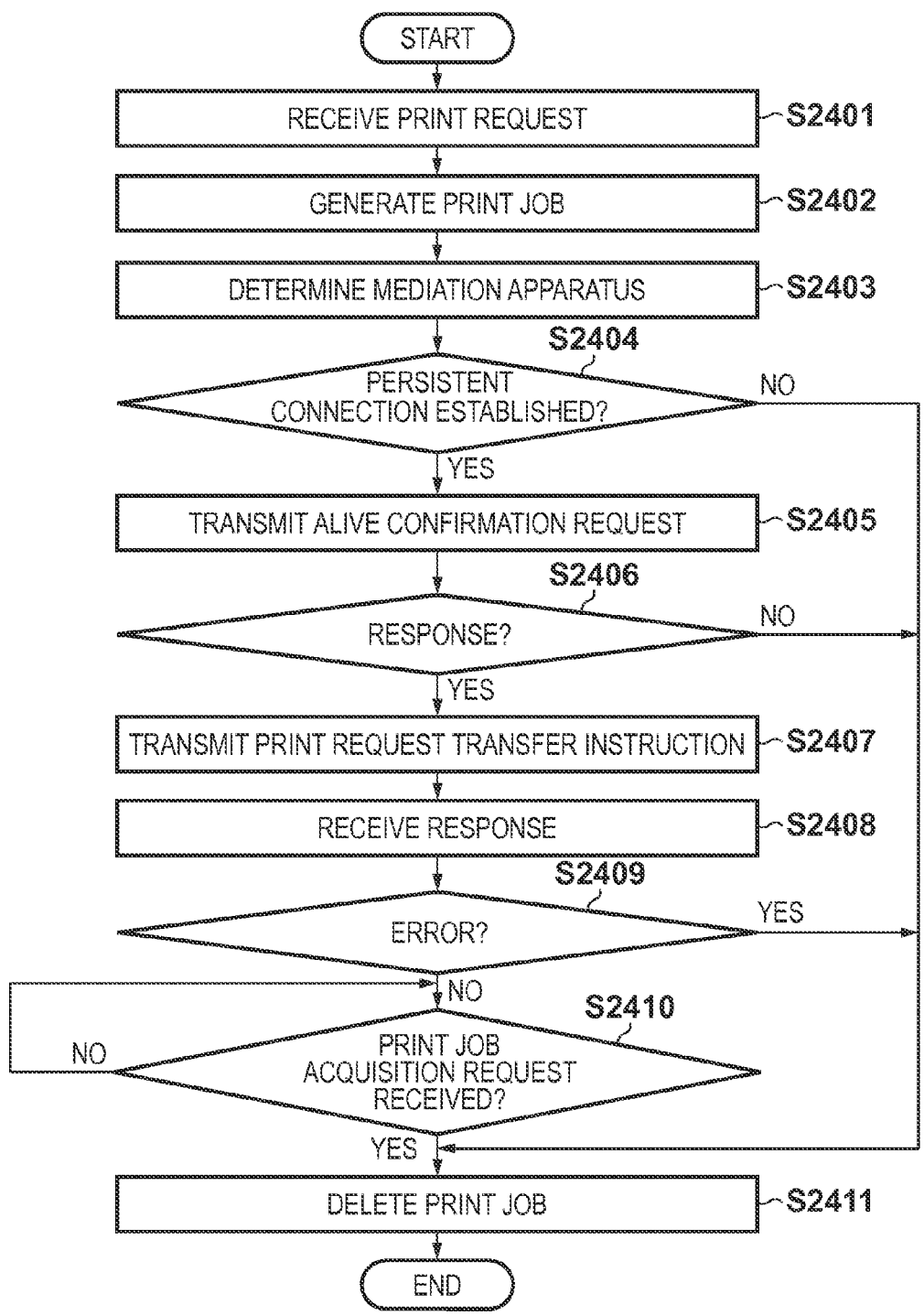
FIG. 15 is a flowchart showing processing concerning a print instruction.

FIG. 15 is a flowchart showing processing when the print server 123 receives a print request according to the second embodiment. In the embodiment, a program concerning this processing sequence by the print server 123 is stored in the HDD 312 of the print server 123, read out to the RAM 303, and executed by the CPU 301.

In step S2401, a Web server unit 702 receives a print request from the client computer 122. Then, in step S2402, a print control unit 704 generates and temporarily accumulates a print job suited to an image forming apparatus designated by the print request. In step S2403, a print request transfer instruction transmission unit 705 looks up the device table 801 and determines the mediation apparatus 104 to which a print request transfer instruction is to be transmitted. In step S2404, the print request transfer instruction transmission unit 705 determines whether a persistent connection with the mediation apparatus 104 has been established.

If the persistent connection has been established (YES in step S2404), the process advances to step S2405, and the print request transfer instruction transmission unit 705 transmits an alive confirmation request to the mediation apparatus 104. The alive confirmation request may use a protocol such as ping. In step S2406, the print request transfer instruction transmission unit 705 determines whether a response has been received from the mediation apparatus 104. If a response has been received from the mediation apparatus 104 (YES in step S2406), the process advances to step S2407, and the print request transfer instruction transmission unit 705 transmits a print request transfer instruction containing the print job to the mediation apparatus 104. The print request transfer instruction transmission unit 705 receives a response to the print request transfer instruction from the mediation apparatus 104 in step S2408, and determines in step S2409 whether the received response is an error response.

If the received response is an error response (YES in step S2409), the print control unit 704 deletes the accumulated print job in step S2411. The process then ends. If the received response is not an error response (NO in step S2409), an event reception unit 708 waits until a job end notification is received from the image forming apparatus 101 in step S2410. Upon receiving a job end notification, in step S2411 the print control unit 704 deletes the accumulated print job, and notifies the client computer 122 that the print processing has ended. The process then ends.

If no persistent connection has been established (NO in step S2404) or no response has been received from the mediation apparatus 104 (NO in step S2406), the process advances to step S2411. The print control unit 704 deletes the accumulated print job, and notifies the client computer 122 that the processing has failed. The process then ends.

[Processing Sequence (Mediation Apparatus)]

Figure 16:
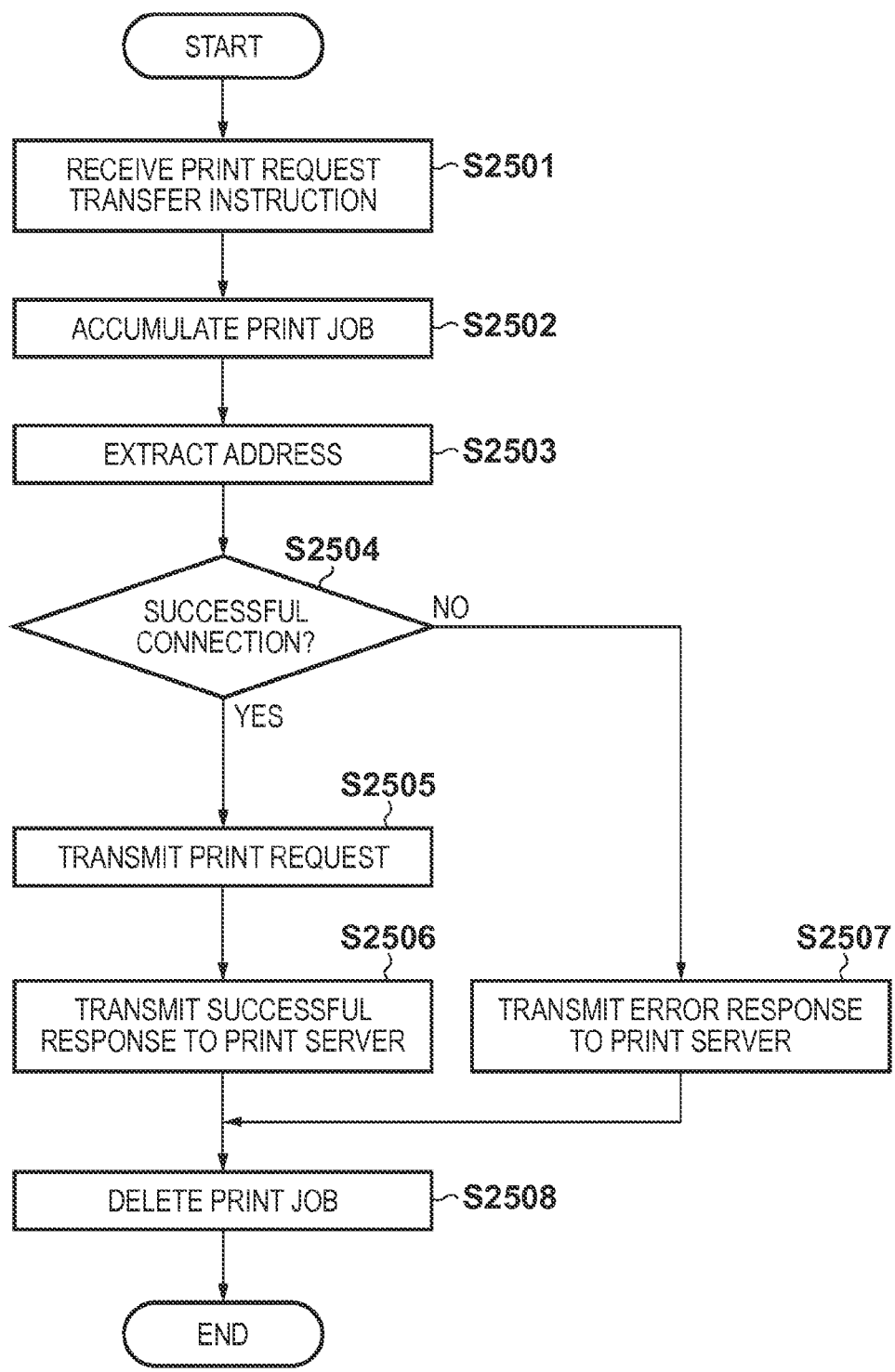
FIG. 16 is a flowchart showing processing concerning a print request transfer instruction.

FIG. 16 is a flowchart showing processing when the mediation apparatus 104 receives a print request transfer instruction from the print server 123 according to the second embodiment. In the embodiment, a program concerning this processing sequence by the mediation apparatus 104 is stored in the HDD 312 of the mediation apparatus 104, read out to the RAM 303, and executed by the CPU 301.

In step S2501, a print request transfer instruction reception unit 502 receives a print request transfer instruction containing a print job from the print server 123. In step S2502, a print request transfer instruction processing unit 503 temporarily accumulates, in the HDD 312, the print job contained in the received print request transfer instruction. In step S2503, the print request transfer instruction processing unit 503 analyzes the received print request transfer instruction and extracts the address of an image forming apparatus to print. In step S2504, a print request transmission unit 504 tries to connect to the extracted address, and determines whether the connection is successful.

If the connection is successful (YES in step S2504), the process advances to step S2505, and the print request transmission unit 504 extracts the print job accumulated in the HDD 312 and transmits a print request to the image forming apparatus 101. In step S2506, the print request transfer instruction reception unit 502 transmits, to the print server 123, a successful response to the print request transfer instruction. In step S2508, the print request transfer instruction processing unit 503 deletes the print job accumulated in the HDD 312. Thereafter, the process ends.

If the connection fails in step S2504 (NO in step S2504), the process advances to step S2507, and the print request transfer instruction reception unit 502 transmits, to the print server 123, an error response to the print request transfer instruction. In step S2508, the print request transfer instruction processing unit 503 deletes the accumulated print job. The process then ends.

[Processing Sequence (Image Forming Apparatus)]

Figure 17:
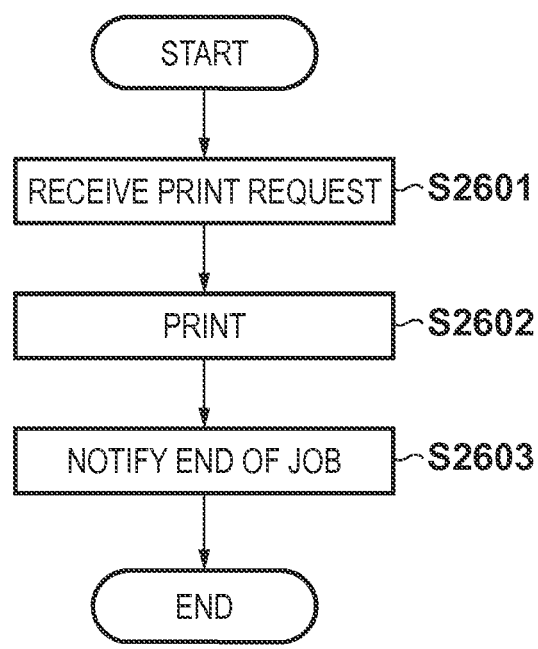
FIG. 17 is a flowchart showing processing concerning a print request.

FIG. 17 is a flowchart showing processing when the image forming apparatus 101 receives a print request from the mediation apparatus 104 according to the second embodiment. In the embodiment, a program concerning this processing sequence by the image forming apparatus 101 is stored in the HDD 211 of the image forming apparatus 101, read out to the RAM 202, and executed by the CPU 201.

In step S2601, a print request reception unit 401 receives a print request containing a print job from the mediation apparatus 104. In step S2602, a print processing unit 403 extracts the print job contained in the received print request and performs print processing for the print job. In step S2603, an event notification unit 404 transmits a job end notification to the print server 123. Then, the process ends.

As described above, the second embodiment can provide a printing system capable of suppressing the load on the print server even when the number of printers increases while making full use of the advantages of PUSH communication.

Third Embodiment

The third embodiment will be described. In the first and second embodiments, the computer hardware in FIG. 3 is used as the mediation apparatus 104. In the third embodiment, an image forming apparatus 101 has the software function of a mediation apparatus 104, and any one image forming apparatus functions as the mediation apparatus 104.

The third embodiment has an effect of suppressing the operational cost because a dedicated apparatus as the mediation apparatus need not be installed in each intranet. However, when the image forming apparatus functions as a mediation apparatus, it may be turned off due to some reason. The third embodiment will explain an arrangement in which the printing system can keep operating even when an image forming apparatus functioning as a mediation apparatus is turned off. In the third embodiment, a description of the same parts as those in the first embodiment will not be repeated, and only a difference will be explained.

[Software Configuration]

Figure 18:
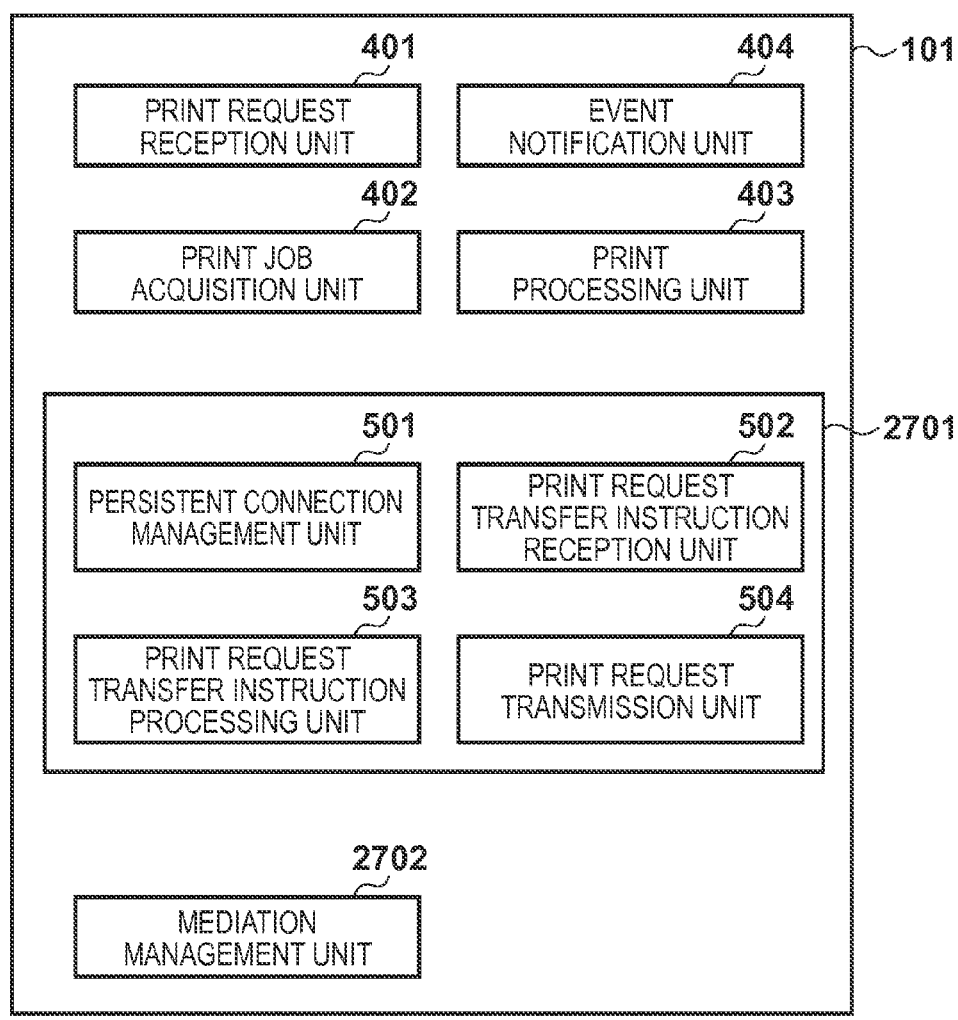
FIG. 18 is a block diagram showing the software configuration of an image forming apparatus according to the third embodiment.

FIG. 18 is a block diagram showing the software configuration of the image forming apparatus 101 according to the third embodiment. In the software configuration shown in FIG. 18, a mediation processing unit 2701 having the function of the mediation apparatus 104 shown in FIG. 4B is added to the software configuration of the image forming apparatus 101 shown in FIG. 4A. With this arrangement, even the image forming apparatus 101 can operate as the mediation apparatus 104.

Although the image forming apparatus 101 has the software configuration of FIG. 18, the mediation processing unit 2701 operates only in an image forming apparatus determined to function as a mediation apparatus, and the mediation processing units 2701 in the remaining image forming apparatuses belonging to the same group as that of the image forming apparatus functioning as a mediation apparatus do not operate. According to a sequence to be described later, a mediation management unit 2702 determines whether to function as a mediation apparatus. The mediation management unit 2702 implements a mediation apparatus management unit.

[Processing of Determining Image Forming Apparatus in Which Mediation Function Operates]

Figure 19:
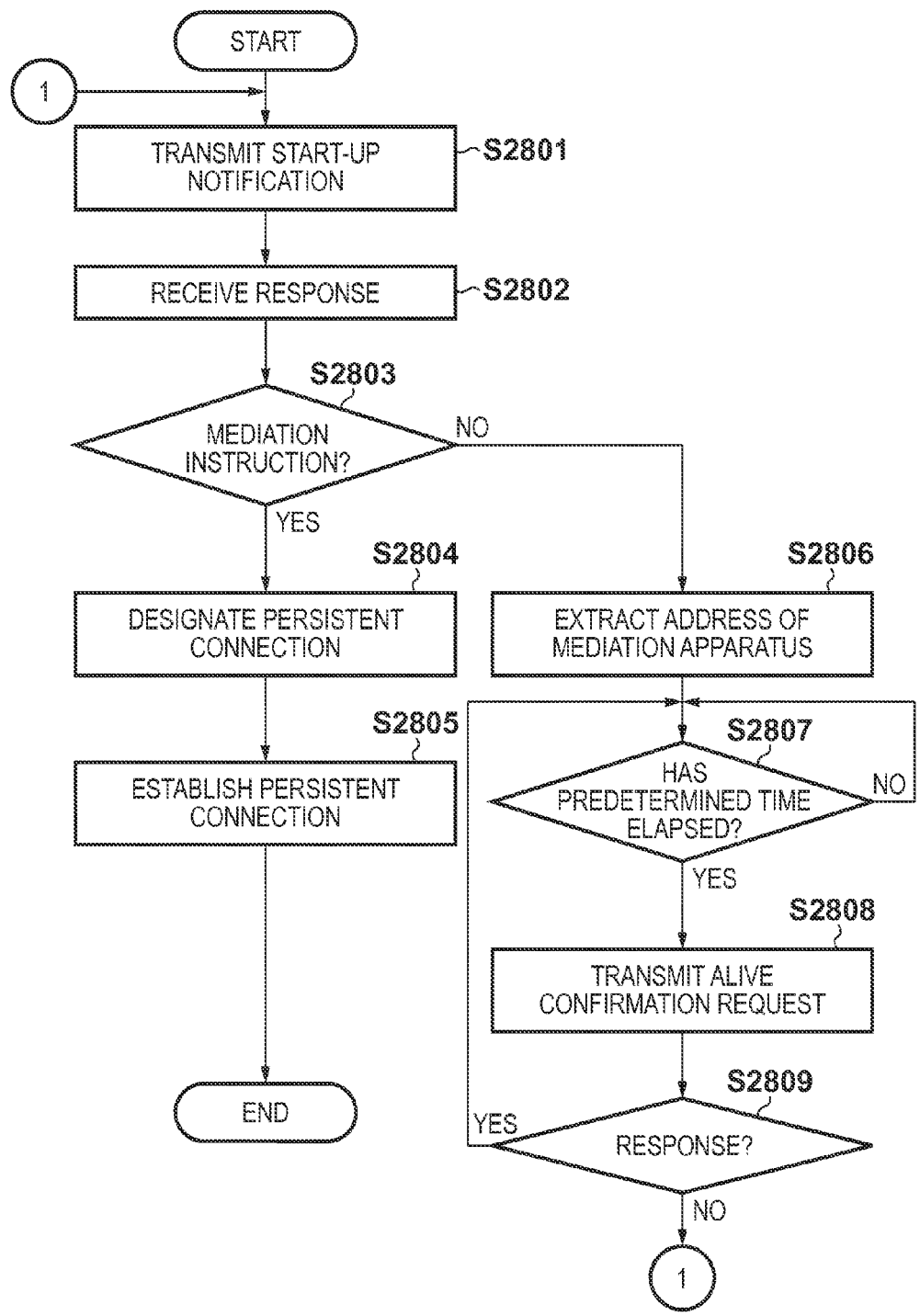
FIG. 19 is a flowchart showing processing until the image forming apparatus is settled in a steady state after start-up.

A method of determining an image forming apparatus to function as a mediation apparatus will be explained. FIG. 19 is a flowchart showing processing until the image forming apparatus 101 is settled in a steady state after start-up. In the embodiment, a program concerning this processing sequence by the image forming apparatus 101 is stored in an HDD 211 of the image forming apparatus 101, read out to a RAM 202, and executed by a CPU 201. FIGS. 20A to 20C exemplify the structures of data to be transmitted/received between apparatuses contained in the printing system according to the third embodiment. Note that the structures shown in FIGS. 20A to 20C are merely examples, and the present invention is not limited to them.

When the image forming apparatus 101 starts up, the mediation management unit 2702 transmits a start-up notification shown in FIG. 20A to a print server 123 in step S2801.

In step S2802, the mediation management unit 2702 receives a start-up notification response shown in FIG. 20B from the print server 123. In step S2803, the mediation management unit 2702 analyzes the received start-up notification response and determines whether it contains a mediation instruction to be described later.

If it is determined that a mediation instruction is contained (YES in step S2803), the process advances to step S2804, and the mediation management unit 2702 notifies a persistent connection management unit 501 of the mediation processing unit 2701 that the role of the mediation apparatus is assigned to the image forming apparatus 101 including the mediation management unit 2702. In step S2805, the persistent connection management unit 501 establishes a persistent connection with the print server 123, and then the start-up processing ends. After that, the assigned image forming apparatus functions as a mediation apparatus. At this time, assume that the image forming apparatus functioning as a mediation apparatus can execute even image forming processing subsequently.

If it is determined that no mediation instruction is contained (NO in step S2803), the process advances to step S2806, and the mediation management unit 2702 extracts the address of an image forming apparatus functioning as a mediation apparatus from the received start-up notification response, and holds it. After that, the mediation management unit 2702 waits until a predetermined time elapses in step S2807. If the predetermined time has elapsed (YES in step S2807), the process advances to step S2808, and the mediation management unit 2702 transmits an alive confirmation request to the extracted address of the mediation apparatus. The alive confirmation request may use a protocol such as ping.

In step S2809, the mediation management unit 2702 determines whether a response has been received from the mediation apparatus 104. If a response has been received (YES in step S2809), the process returns to step S2807. If no response has been received (NO in step S2809), the process returns to step S2801 to execute, again from the beginning, the sequence of determining an image forming apparatus to function as a mediation apparatus.

FIG. 20A exemplifies a start-up notification to be transmitted from the mediation management unit 2702 to the print server 123. The start-up notification contains various kinds of information of the image forming apparatus 101.

FIGS. 20B and 20C exemplify start-up notification responses to be transmitted from the print server 123 to the mediation management unit 2702. The value of a <Mediation> tag becomes "true" as shown in FIG. 20B when the print server 123 assigns the role of a mediation apparatus to the image forming apparatus 101, and "false" as shown in FIG. 20C when it does not assign the role of a mediation apparatus. When the role of a mediation apparatus is not assigned, a <MediationAddress> tag contains the local IP address of an image forming apparatus which currently functions as a mediation apparatus. By referring to the local IP address, the image forming apparatus 101 accesses the mediation apparatus belonging to the same group.

[Processing Sequence (Print Server)]

Figure 21:
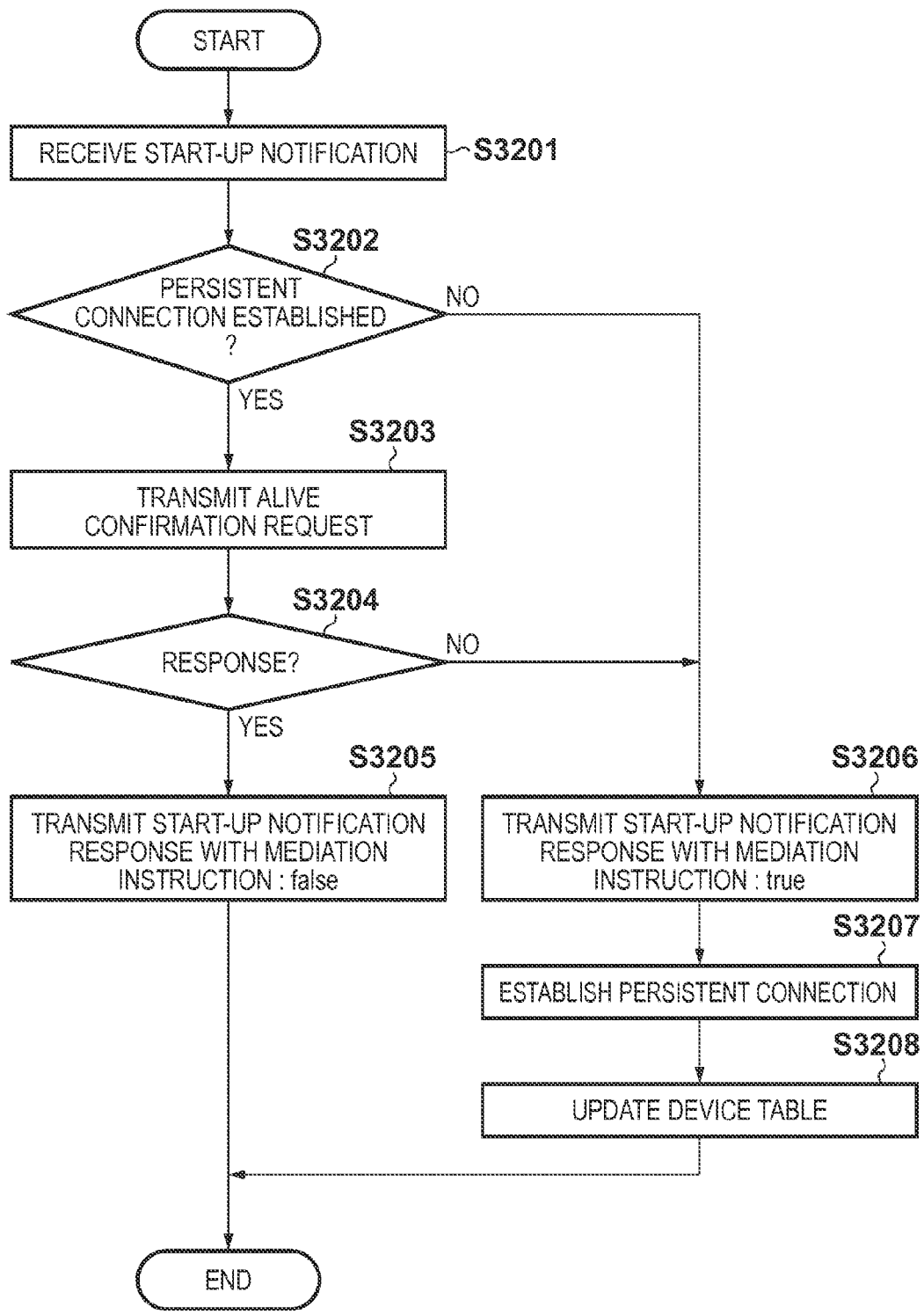
FIG. 21 is a flowchart showing processing concerning a start-up notification.

FIG. 21 is a flowchart showing processing when the print server 123 receives a start-up notification from the mediation management unit 2702. In the embodiment, a program concerning this processing sequence by the print server 123 is stored in an HDD 312 of the print server 123, read out to a RAM 303, and executed by a CPU 301.

In step S3201, a device table management unit 707 receives a start-up notification from the mediation management unit 2702. In step S3202, the device table management unit 707 searches the device table 801 for a group to which the image forming apparatus 101 that has transmitted the start-up notification belongs. Further, the device table management unit 707 determines whether a persistent connection with the group has already been established. If the device table management unit 707 determines that a persistent connection has already been established (YES in step S3202), the process advances to step S3203, and the device table management unit 707 transmits an alive confirmation request to the mediation apparatus 104 serving as the connection destination of the established persistent connection.

In step S3204, the device table management unit 707 determines whether a response has been received from the mediation apparatus 104. If a response has been received (YES in step S3204), the process advances to step S3205. The device table management unit 707 sets "false" as the value of <Mediation> contained in the mediation instruction, as shown in FIG. 20C, and transmits a start-up notification response containing the local IP address of the mediation apparatus 104 to the mediation management unit 2702. Then, the process ends.

If no persistent connection has been established (NO in step S3202) or no response has been received from the mediation apparatus 104 (NO in step S3204), the process advances to step S3206. The device table management unit 707 sets "true" as the value of <Mediation> contained in the mediation instruction, as shown in FIG. 20B, and transmits a start-up notification response to the mediation management unit 2702. Thereafter, in step S2805 of FIG. 10, the persistent connection management unit 501 of the image forming apparatus 101 issues a persistent connection establishment request. In response to this, the persistent connection management unit 701 of the print server 123 establishes a persistent connection in step S3207.

In step S3208, the device table management unit 707 updates information about the mediation apparatus in the device table 801. The processing sequence then ends.

According to the third embodiment, the print server dynamically determines an image forming apparatus to function as a mediation apparatus. In addition to the effects of the first embodiment, when an image forming apparatus functioning as a mediation apparatus is turned off, another image forming apparatus detects it, and an image forming apparatus to function as a mediation apparatus can be determined again.

Fourth Embodiment

The fourth embodiment will be explained. In the first to third embodiments, the administrator creates the device table 801 in advance. In the fourth embodiment, when newly installing an image forming apparatus, the image forming apparatus transmits its information to the print server. Based on the received information, the print server updates a device table 801.

The fourth embodiment has an effect of reducing the burden on the administrator because he need not set the device table every time an image forming apparatus is added/deleted. In the fourth embodiment, a description of the same parts as those in the first embodiment will not be repeated, and only a difference will be explained.

[Software Configuration]

Figure 22A:
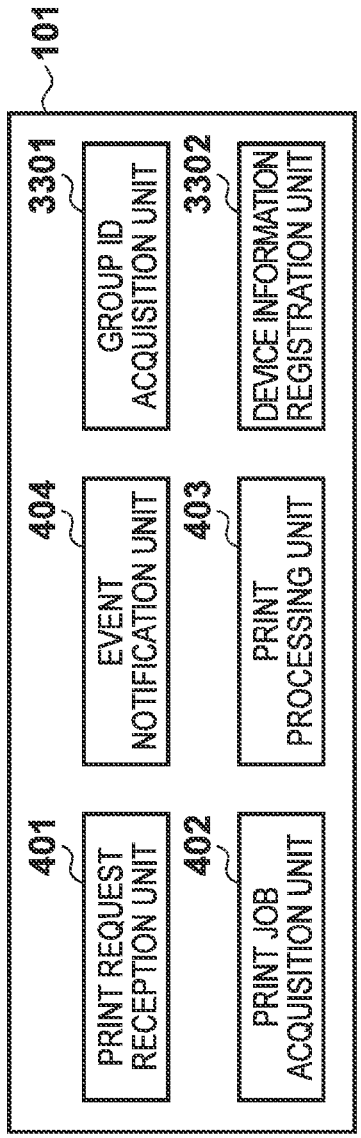
FIGS. 22A and 22B are block diagrams showing the software configurations of respective apparatuses.
Figure 22B:
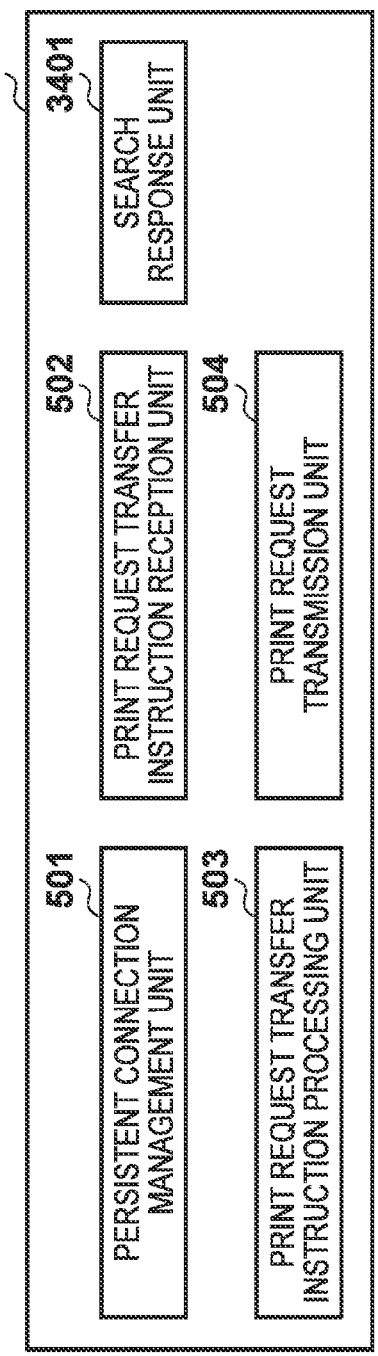

FIGS. 22A and 22B show the software configurations of respective apparatuses contained in a printing system according to the fourth embodiment.

FIG. 22A is a block diagram showing the software configuration of an image forming apparatus 101 according to the fourth embodiment. A group ID acquisition unit 3301 and device information registration unit 3302 are added to the software configuration shown in FIG. 4A described in the first embodiment. The group ID acquisition unit 3301 searches for a mediation apparatus 104 within an intranet, and acquires a group ID from the detected mediation apparatus 104. The device information registration unit 3302 transmits various kinds of information of the image forming apparatus 101 to a print server 123, and registers them in association with each other. The group ID acquisition unit 3301 implements an identification information acquisition unit. The device information registration unit 3302 implements a registration request transmission unit.

FIG. 22B is a block diagram showing the software configuration of the mediation apparatus 104. A search response unit 3401 is added to the software configuration shown in FIG. 4B described in the first embodiment. The search response unit 3401 responds to a search request transmitted from the image forming apparatus 101, or transmits a group ID.

[Start-Up Processing Sequence]

Figure 23:
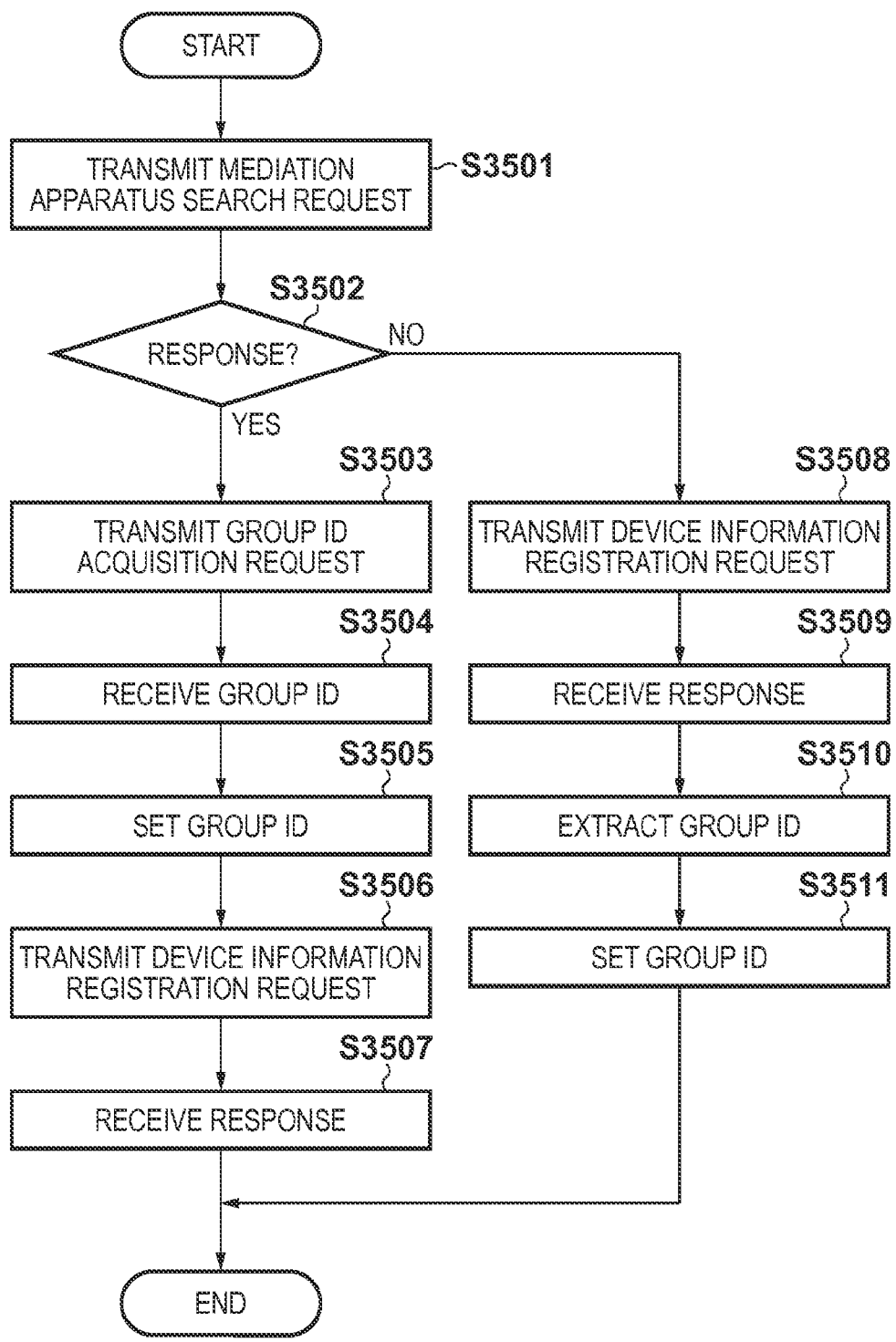
FIG. 23 is a flowchart showing processing concerning start-up.

FIG. 23 is a flowchart showing processing when the image forming apparatus 101 whose group ID has not been set starts up. In the embodiment, a program concerning this sequence by the image forming apparatus 101 is stored in an HDD 211 of the image forming apparatus 101, read out to a RAM 202, and executed by a CPU 201. FIGS. 24A to 24C exemplify the structures of data to be transmitted/received in the printing system according to the fourth embodiment. Note that the structures shown in FIGS. 24A to 24C are merely examples, and the present invention is not limited to them.

In step S3501, the group ID acquisition unit 3301 transmits a mediation apparatus search request by multicast to search for an apparatus running as a mediation apparatus within an intranet to which the group ID acquisition unit 3301 belongs. A protocol for searching for a mediation apparatus can be a standard protocol such as WS-Discovery. Another protocol is also available.

In step S3502, the group ID acquisition unit 3301 determines whether a search response has been received. If a search response has been received (YES in step S3502), the process advances to step S3503, and the group ID acquisition unit 3301 transmits a group ID acquisition request to the mediation apparatus 104. In step S3504, the group ID acquisition unit 3301 receives a group ID as a response from the mediation apparatus 104. In step S3505, the group ID acquisition unit 3301 stores the received group ID as the group ID of the group to which the group ID acquisition unit 3301 belongs. In step S3506, the device information registration unit 3302 transmits, to the print server 123, a device information registration request shown in FIG. 24A containing the group ID. In step S3507, the device information registration unit 3302 receives a device information registration response shown in FIG. 24C from the print server 123. Then, the process ends.

If no search response has been received in step S3502 (NO in step S3502), the process advances to step S3508, and the device information registration unit 3302 transmits a device information registration request shown in FIG. 24B to the print server 123. In step S3509, the device information registration unit 3302 receives the device information registration response shown in FIG. 24C from the print server 123. In step S3510, the device information registration unit 3302 extracts the group ID from the received device information registration response. In step S3511, the device information registration unit 3302 stores the extracted group ID as the group ID of the image forming apparatus 101 including the device information registration unit 3302. Thereafter, the process ends.

FIGS. 24A and 24B exemplify device information registration requests to be transmitted from the device information registration unit 3302 to the print server 123. If the group ID acquisition unit 3301 has acquired a group ID from the mediation apparatus 104 in step S3504 of FIG. 23, the acquired group ID is set in a <GroupId> tag, as shown in FIG. 24A. If the group ID acquisition unit 3301 could not acquire a group ID from the mediation apparatus 104, the <GroupId> value becomes blank, as shown in FIG. 24B.

FIG. 24C exemplifies a device information registration response to be transmitted from the print server 123 to the device information registration unit 3302. If the device information registration unit 3302 has set <GroupId> when transmitting a device information registration request (steps S3505 and S3506), the same value is set in <GroupId>. If the device information registration unit 3302 has set <GroupId> to be blank when transmitting a device information registration request (step S3508), a group ID value assigned by the print server 123 to the image forming apparatus is set, which will be described below.

[Processing Sequence (Print Server)]

Figure 25:
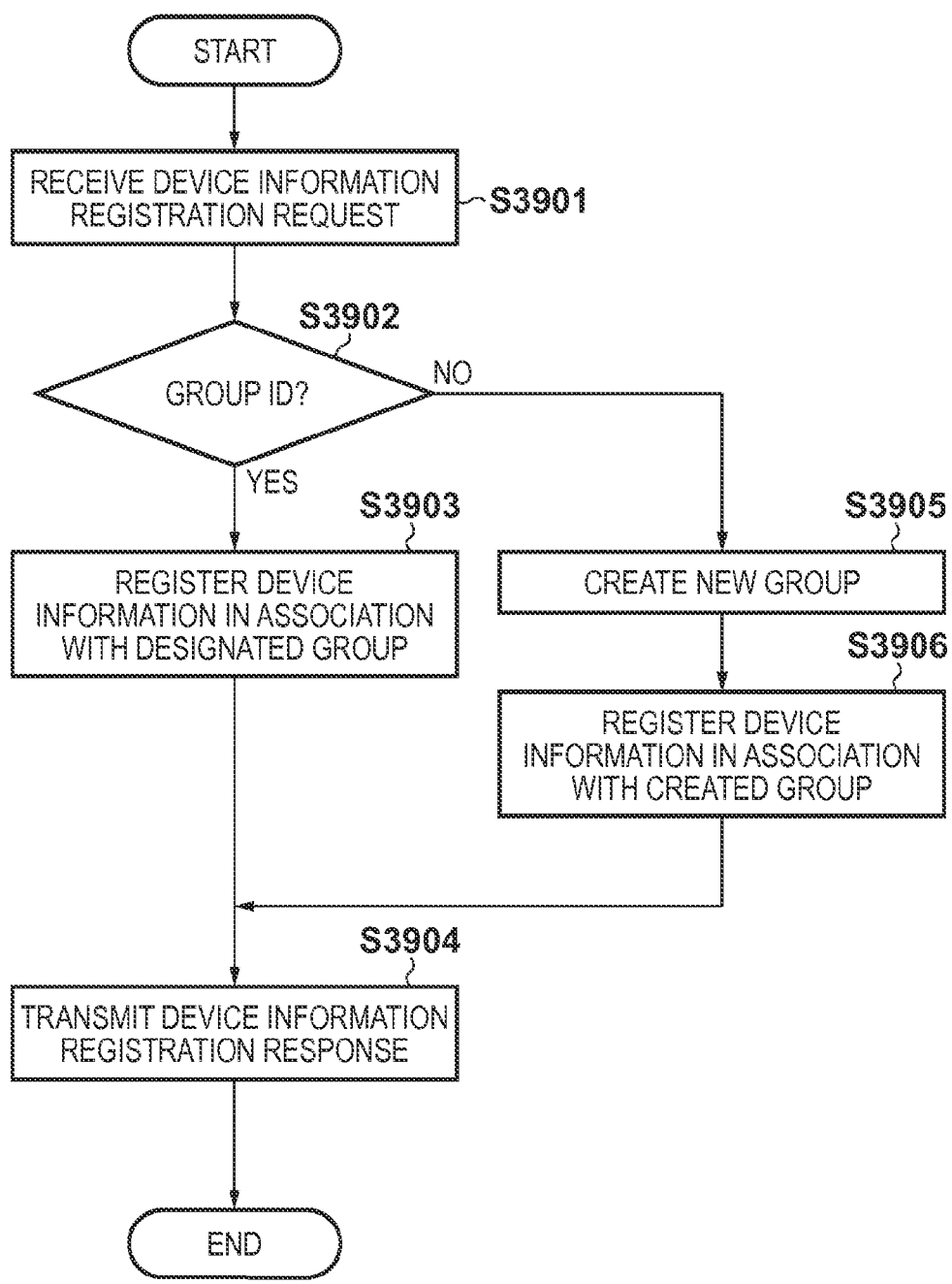
FIG. 25 is a flowchart showing processing concerning a device information registration request.

FIG. 25 is a flowchart showing processing when the print server 123 receives a device information registration request. In the embodiment, a program concerning this processing sequence by the print server 123 is stored in an HDD 312 of the print server 123, read out to a RAM 303, and executed by a CPU 301.

In step S3901, a device table management unit 707 receives a device information registration request from the device information registration unit 3302. In step S3902, the device table management unit 707 determines whether the device information registration request contains a group ID. If a group ID is contained (YES in step S3902), the process advances to step S3903, and the device table management unit 707 registers device information concerning the received device information registration request in association with a designated group in the device table 801. In step S3904, the device table management unit 707 transmits the device information registration response shown in FIG. 24C to the device information registration unit 3302. The process then ends.

If the device information registration request does not contain a group ID (NO in step S3902), the process advances to step S3905, and the device table management unit 707 creates a new group in the device table 801 and issues a corresponding new group ID. In step S3906, the device table management unit 707 registers device information in association with the group created in step S3905. In step S3904, the device table management unit 707 transmits a device information registration response containing the generated group ID to the device information registration unit 3302. The process then ends.

According to the fourth embodiment, when newly installing an image forming apparatus, the device table can be updated without the mediacy of the administrator. In an environment where a printing system is already running, the group ID can be set as that of the new image forming apparatus not to generate a redundant group.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-267500, filed Nov. 30, 2010, which is hereby incorporated by reference herein in its entirety.

What is claimed is:

1. A printing system comprising a print server, one or more mediation apparatuses, and one or more image forming apparatuses, wherein said print server is located on an external network, said one or more mediation apparatuses and said one or more image forming apparatuses are located on an internal network, and a firewall is located between said external network and said internal network, said print server including:
a first connection unit configured to establish a connection with each of said one or more mediation apparatuses and to maintain the established connection to be able to transmit data from said print server serving as a source across said firewall;
a management unit configured to manage a mediation apparatus and one or more image forming apparatuses in association with each other as a group;
a transfer instruction transmission unit configured, upon receiving a print instruction, to determine, among said one or more mediation apparatuses, a mediation apparatus to which a print request transfer instruction is to be transmitted, and to transmit the print request transfer instruction to the determined mediation apparatus via the maintained connection; and
a processing unit configured, upon receiving a print job acquisition request, to transmit a print job in response to the print job acquisition request, each of said one or more mediation apparatuses including:
a second connection unit configured to establish a connection with said print server in correspondence with said first connection unit of said print server, and to maintain the established connection to be able to transmit data from said print server serving as a source across said firewall;
a transfer instruction reception unit configured to receive the print request transfer instruction from said print server via the maintained connection;
a determination unit configured to analyze the received print request transfer instruction and to determine, among one or more image forming apparatuses associated as the same group, an image forming apparatus which is to execute print processing; and
a print request transmission unit configured to transmit a print request to the image forming apparatus determined by said determination unit, and each of said one or more image forming apparatuses including:
a print request reception unit configured to receive the print request from a mediation apparatus associated as the same group;
a print job acquisition unit configured, in order to acquire a print job corresponding to the print request, to transmit the print job acquisition request to said print server and to receive the print job as a response to the print job acquisition request;

a printing unit configured to execute print processing for the print job received by said print job acquisition unit;

an identification information acquisition unit configured to acquire, from a mediation apparatus, identification information for identifying a group; and a registration request transmission unit configured, in a case where said identification information acquisition unit has acquired the identification information, to transmit, to said print server, a registration request containing the identification information and information of said image forming apparatus, wherein said management unit of said print server manages an image forming apparatus in association with a group indicated by the identification information in response to the registration request from any one of said one or more image forming apparatuses, wherein in a case where said identification information acquisition unit of said image forming apparatus could not acquire the identification information, said registration request transmission unit transmits a registration request containing no identification information to said print server, wherein said management unit of said print server issues new identification information in response to the registration request containing no identification information, and manages the new identification information and said image forming apparatus in association with each other, and wherein at least one of the first connection unit, the management unit, the transfer instruction transmission unit, the processing unit, the second connection unit, the transfer instruction reception unit, the determination unit, the print request transmission unit, the print request reception unit, the print job acquisition unit, the printing unit, the identification information acquisition unit, and the registration request transmission unit is implemented by a processor.

2. The system according to claim 1, wherein each of said one or more image forming apparatuses further includes a mediation apparatus management unit configured to manage a mediation apparatus in a group associated with said image forming apparatus, said mediation apparatus management unit inquires, of said print server, information of a mediation apparatus associated with the same group and manages said mediation apparatus based on a response to the inquiry, and said management unit of said print server transmits, in response to the inquiry from any one of said one or more image forming apparatuses about information of a mediation apparatus, information of a mediation apparatus associated with the same group as a group of said image forming apparatus which has inquired.

3. The system according to claim 2, wherein said one or more image forming apparatuses further includes respective units of a mediation apparatus, in a cases where, in responding to an inquiry from any one of said one or more image forming apparatuses about information of a mediation apparatus, a mediation apparatus associated with the same group as a group of said image forming apparatus which has inquired does not exist, said management unit of said print server transmits an instruction to said image forming apparatus which has inquired to operate as a mediation apparatus, and upon receiving the instruction from said print server to operate as a mediation apparatus, said mediation apparatus management unit of said image forming apparatus operates respective units of said image forming apparatus operating as said mediation apparatus.

4. A printing method in a printing system including a print server, one or more mediation apparatuses, and one or more image forming apparatuses, wherein the print server is located on an external network, the one or more mediation apparatuses and the one or more image forming apparatuses are located on an internal network, and a firewall is located between the external network and the internal network, the printing method comprising:

in the print server, a first connection step of establishing a connection with each of said one or more mediation apparatuses and maintaining the established connection to be able to transmit data from the print server serving as a source across a firewall;

a management step of managing a mediation apparatus and one or more image forming apparatuses in association with each other as a group;

a transfer instruction transmission step of, upon receiving a print instruction, determining, among said one or more mediation apparatuses, a mediation apparatus to which a print request transfer instruction is to be transmitted, and transmitting the print request transfer instruction to the determined mediation apparatus via the maintained connection; and a processing step of, upon receiving a print job acquisition request, transmitting a print job in response to the print job acquisition request, in each of the one or more mediation apparatuses, a second connection step of establishing a connection with the print server in correspondence with the first connection step in the print server, and maintaining the established connection to be able to transmit data from the print server serving as a source across the firewall;

a transfer instruction reception step of receiving the print request transfer instruction from the print server via the maintained connection;

a determination step of analyzing the received print request transfer instruction and determining, among one or more image forming apparatuses associated as the same group, an image forming apparatus which is to execute print processing; and a print request transmission step of transmitting a print request to the image forming apparatus determined in the determination step, and in each of the one or more image forming apparatuses, a print request reception step of receiving the print request from a mediation apparatus associated as the same group;

a print job acquisition step of, in order to acquire a print job corresponding to the print request, transmitting the print job acquisition request to the print server and receiving the print job as a response to the print job acquisition request;

a printing step of executing print processing for the print job received in the print job acquisition step;

an identification information acquisition step of acquiring from the mediation apparatus, identification information for identifying a group; and a registration request transmission step of, in a case where the identification information has been acquired in the identification information acquisition step, transmitting, to the print server, a registration request containing the identification information and information of the image forming apparatus, wherein in the management step in the print server, an image forming apparatus in association with the group indicated by the identification information is managed in response to the registration request from any one of the one or more image forming apparatuses, wherein in a case where in the identification information acquisition step in the image forming apparatus, the identification information could not be acquired, a registration request containing no identification information is transmitted to the print server in the registration request transmission step, and wherein in the management step in the print server, new identification information is issued in response to the registration request containing no identification information, and the new identification information and the image forming apparatus in association with each other are managed.

5. A print server in a printing system including a print server, one or more mediation apparatuses, and one or more image forming apparatuses, wherein said print server is located on an external network, said one or more mediation apparatuses and said one or more image forming apparatuses are located on an internal network, and a firewall is located between said external network and said internal network, said print server comprising:

a connection unit configured to establish a connection with each of said one or more mediation apparatuses and to maintain the established connection to be able to transmit data from the print server serving as a source across said firewall;

a management unit configured to manage a mediation apparatus and one or more image forming apparatuses in association with each other as a group;

a transfer instruction transmission unit configured, upon receiving a print instruction, to determine, among said one or more mediation apparatuses, a mediation apparatus to which a print request transfer instruction is to be transmitted, and to transmit the print request transfer instruction to the determined mediation apparatus via the maintained connection; and a processing unit configured, upon receiving a print job acquisition request, to transmit a print job in response to the print job acquisition request, wherein said management unit manages an image forming apparatus in association with the group indicated by the identification information in response to a registration request from any one of said one or more image forming apparatus, wherein said management unit issues new identification information in response to the registration request containing no identification information, and manages the new identification information and said image forming apparatus in association with each other, and wherein at least one of the connection unit, the management unit, the transfer instruction transmission unit and the processing unit is implemented by a processor.

6. A mediation apparatus in a printing system including a print server, one or more mediation apparatuses, and one or more image forming apparatuses, wherein said print server is located on an external network, said one or more mediation apparatuses and said one or more image forming apparatuses are located on an internal network, and a firewall is located between said external network and said internal network, said mediation apparatus comprising:

a connection unit configured to establish a connection with the print server and to maintain the established connection to be able to transmit data from the print server serving as a source across said firewall;

a transfer instruction reception unit configured to receive a print request transfer instruction from the print server via the maintained connection;

a determination unit configured to analyze the received print request transfer instruction and to determine, among one or more image forming apparatuses associated as the same group, an image forming apparatus which is to execute print processing; and a print request transmission unit configured to transmit a print request to the image forming apparatus determined by said determination unit, wherein at least one of the connection unit, the transfer instruction reception unit, the determination unit and the print request transmission unit is implemented by a processor.

7. An image forming apparatus in a printing system including a print server, one or more mediation apparatuses, and one or more image forming apparatuses, wherein said print server is located on an external network, said one or more mediation apparatuses and said one or more image forming apparatuses are located on an internal network, and a firewall is located between said external network and said internal network, the image forming apparatus comprising:

a print request reception unit configured to receive a print request from a mediation apparatuses;

a print job acquisition unit configured, in order to acquire a print job corresponding to the print request, to transmit a print job acquisition request to the print server and to receive the print job as a response to the print job acquisition request;

a printing unit configured to execute print processing for the print job received by said print job acquisition unit;

an identification information acquisition unit configured to acquire, from a mediation apparatus, identification information for identifying a group; and a registration request transmission unit configured, in a case where said identification information acquisition unit has acquired the identification information, to transmit, to said print server, a registration request containing the identification information and information of said image forming apparatus, wherein in a case where said identification information acquisition unit could not acquire the identification information, said registration request transmission unit transmits a registration request containing no identification information to said print server, and wherein at least one of the print request reception unit, the print job acquisition unit, the printing unit, the identification information acquisition unit and the registration request transmission unit is implemented by a processor.

8. A non-transitory computer-readable medium storing a program for causing a computer to function as a connection unit configured to establish a connection with each of one or more mediation apparatuses configured to mediate an instruction to a printing apparatus, and to maintain the established connection to be able to transmit data from the computer serving as a source across a firewall, a management unit configured to manage a mediation apparatus and one or more image forming apparatuses in association with each other as a group, a transfer instruction transmission unit configured, upon receiving a print instruction, to determine, among the one or more mediation apparatuses, a mediation apparatus to which a print request transfer instruction is to be transmitted, and to transmit the print request transfer instruction to the determined mediation apparatus via the maintained connection, and a processing unit configured, upon receiving a print job acquisition request, to transmit a print job in response to the print job acquisition request, wherein the management unit manages an image forming apparatus in association with the group indicated by the identification information in response to a registration request from any one of the one or more image forming apparatus, and wherein the management unit issues new identification information in response to the registration request containing no identification information, and manages the new identification information and the image forming apparatus in association with each other, and wherein the computer is located on an external network, the one or more mediation apparatuses and the one or more image forming apparatuses are located on an internal network, and the firewall is located between the external network and the internal network.

9. A non-transitory computer-readable medium storing a program for causing a computer to function as a connection unit configured to establish a connection with the print server and to maintain the established connection to be able to transmit data from the print server serving as a source across a firewall, a transfer instruction reception unit configured to receive a print request transfer instruction from the print server via the maintained connection, a determination unit configured to analyze the received print request transfer instruction and to determine, among one or more image forming apparatuses associated as the same group, an image forming apparatus which is to execute print processing, and a print request transmission unit configured to transmit a print request to the image forming apparatus determined by the determination unit, wherein the computer and the one or more image forming apparatuses are located on an internal network, and the print server is located on an external network, and the firewall is located between the external network and the internal network.

10. A non-transitory computer-readable medium storing a program for causing a computer to function as a print request reception unit configured to receive a print request from a mediation apparatus associated as the same group, a print job acquisition unit configured, in order to acquire a print job corresponding to the print request, to transmit a print job acquisition request to a print server and receives the print job as a response to the print job acquisition request, a printing unit configured to execute print processing for the print job received by the print job acquisition unit, an identification information acquisition unit configured to acquire, from a mediation apparatus, identification information for identifying a group; and a registration request transmission unit configured, in a case where the identification information acquisition unit has acquired the identification information, to transmit, to the print server, a registration request containing the identification information and information of the computer, wherein in a case where said identification information acquisition unit could not acquire the identification information, the registration request transmission unit transmits a registration request containing no identification information to the print server, and wherein the computer and the mediation apparatus are located on an internal network, and the print server is located on an external network, and the firewall is located between the external network and the internal network.

11. The printing system according to claim 1, wherein, said printing system further comprises an information processing apparatus which is located on said external network, and the print instruction is transmitted from said information processing apparatus to said print server.

* * * * *